US012425437B2

(12) United States Patent
Dahlberg et al.

(10) Patent No.: US 12,425,437 B2
(45) Date of Patent: Sep. 23, 2025

(54) SYSTEMS AND METHODS FOR PRECOMPUTATION OF DIGITAL ASSET INVENTORIES

(71) Applicant: BitSight Technologies, Inc., Boston, MA (US)

(72) Inventors: Daniel Dahlberg, Somerville, MA (US); Austin Payne Allshouse, Raleigh, NC (US)

(73) Assignee: BitSight Technologies, Inc., Boston, MA (US)

( * ) Notice: Subject to any disclaimer, the term of this patent is extended or adjusted under 35 U.S.C. 154(b) by 97 days.

(21) Appl. No.: 17/945,337

(22) Filed: Sep. 15, 2022

(65) Prior Publication Data
US 2023/0091953 A1    Mar. 23, 2023

Related U.S. Application Data

(60) Provisional application No. 63/245,427, filed on Sep. 17, 2021.

(51) Int. Cl.
*H04L 9/40* (2022.01)
*G06F 16/901* (2019.01)

(52) U.S. Cl.
CPC ...... *H04L 63/1433* (2013.01); *G06F 16/9024* (2019.01)

(58) Field of Classification Search
None
See application file for complete search history.

(56) References Cited

U.S. PATENT DOCUMENTS

| | | |
|---|---|---|
| 5,867,799 A | 2/1999 | Lang et al. |
| 6,016,475 A | 1/2000 | Miller et al. |
| 6,578,066 B1 | 6/2003 | Logan et al. |
| 6,745,150 B1 | 6/2004 | Breiman |
| 6,785,732 B1 | 8/2004 | Bates et al. |
| 6,792,401 B1 | 9/2004 | Nigro et al. |

(Continued)

FOREIGN PATENT DOCUMENTS

| | | |
|---|---|---|
| WO | WO-2007120140 A1 | 10/2007 |
| WO | WO-2017/142694 A1 | 1/2019 |
| WO | WO-2019/023045 A1 | 1/2019 |

OTHER PUBLICATIONS

Khalil et al. "Discovering Malicious Domains through Passive DNS Data Graph Analysis". Jun. 2016 (Year: 2016).*

(Continued)

*Primary Examiner* — Scott B Christensen
(74) *Attorney, Agent, or Firm* — Goodwin Procter LLP

(57) ABSTRACT

Methods and supporting systems for discovering and attributing computational assets to respective entities includes receiving datasets comprising source record data for numerous of entities and including attributes such as point of contact data elements and normalizing the data elements to maintain a consistent format across the source record data. A filter is applied against the normalized source record data to identify data that are either (i) redundant or (ii) refer to a bulk control entity. A further curation step can be applied against the data as the data is stored as a bipartite graph, wherein a first set of nodes of the bipartite graph represents source records and a second set of nodes represents attributes of the source records.

22 Claims, 6 Drawing Sheets

(56) References Cited

U.S. PATENT DOCUMENTS

| | | |
|---|---|---|
| 7,062,572 B1 | 6/2006 | Hampton |
| D525,264 S | 7/2006 | Chotai et al. |
| D525,629 S | 7/2006 | Chotai et al. |
| 7,100,195 B1 | 8/2006 | Underwood |
| 7,124,055 B2 | 10/2006 | Breiman |
| 7,194,769 B2 | 3/2007 | Lippmann et al. |
| 7,257,630 B2 | 8/2007 | Cole et al. |
| 7,290,275 B2 | 10/2007 | Baudoin et al. |
| 7,343,626 B1 | 3/2008 | Gallagher |
| 7,389,262 B1 | 6/2008 | Lange |
| 7,409,357 B2 | 8/2008 | Schaf et al. |
| D604,740 S | 11/2009 | Matheny et al. |
| 7,650,570 B2 | 1/2010 | Torrens et al. |
| 7,747,778 B1 | 6/2010 | King et al. |
| 7,748,038 B2 | 6/2010 | Olivier et al. |
| 7,827,607 B2 | 11/2010 | Sobel et al. |
| D630,645 S | 1/2011 | Tokunaga et al. |
| 7,971,252 B2 | 6/2011 | Lippmann et al. |
| 8,000,698 B2 | 8/2011 | Wolman et al. |
| 8,042,184 B1 | 10/2011 | Batenin |
| 8,056,132 B1 | 11/2011 | Chang et al. |
| D652,048 S | 1/2012 | Joseph |
| 8,150,538 B2 | 4/2012 | Dubinsky |
| 8,239,939 B2 | 8/2012 | Dunagan et al. |
| D667,022 S | 9/2012 | LoBosco et al. |
| 8,266,695 B1 | 9/2012 | Clay, IV |
| 8,321,791 B2 | 11/2012 | Dixon et al. |
| 8,359,651 B1 | 1/2013 | Wu et al. |
| 8,370,193 B2 | 2/2013 | Saraf |
| 8,370,933 B1 | 2/2013 | Buckler |
| 8,370,938 B1 | 2/2013 | Daswani et al. |
| 8,429,630 B2 | 4/2013 | Nickolov et al. |
| D682,287 S | 5/2013 | Cong et al. |
| D688,260 S | 8/2013 | Pearcy et al. |
| 8,504,556 B1 | 8/2013 | Rice et al. |
| 8,505,094 B1 | 8/2013 | Xuewen et al. |
| 8,533,843 B2 | 9/2013 | Levi |
| D691,164 S | 10/2013 | Lim et al. |
| D694,252 S | 11/2013 | Helm |
| D694,253 S | 11/2013 | Helm |
| 8,578,499 B1 | 11/2013 | Zhu et al. |
| 8,584,233 B1 | 11/2013 | Yang et al. |
| D696,677 S | 12/2013 | Corcoran et al. |
| 8,601,575 B2 | 12/2013 | Mullarkey et al. |
| 8,621,621 B1 | 12/2013 | Burns et al. |
| 8,661,146 B2 | 2/2014 | Alex et al. |
| D700,616 S | 3/2014 | Chao |
| 8,677,481 B1 | 3/2014 | Lee |
| 8,683,584 B1 | 3/2014 | Daswani et al. |
| 8,752,183 B1 | 6/2014 | Heiderich et al. |
| 8,775,402 B2 | 7/2014 | Baskerville et al. |
| 8,776,240 B1 | 7/2014 | Wu et al. |
| 8,806,646 B1 | 8/2014 | Daswani et al. |
| 8,825,662 B1 | 9/2014 | Kingman et al. |
| 8,839,432 B1 | 9/2014 | Patil |
| 8,850,570 B1 | 9/2014 | Ramzan |
| 8,898,776 B2 | 11/2014 | Molnar et al. |
| D719,969 S | 12/2014 | Ebtekar et al. |
| 8,949,988 B2 | 2/2015 | Adams et al. |
| 8,949,990 B1 | 2/2015 | Hsieh et al. |
| 8,966,639 B1 | 2/2015 | Roytman et al. |
| D727,942 S | 4/2015 | Angelides |
| 9,015,263 B2 | 4/2015 | Styler et al. |
| D730,918 S | 6/2015 | Park et al. |
| 9,049,222 B1 | 6/2015 | He et al. |
| 9,053,210 B2 | 6/2015 | Elnikety et al. |
| 9,075,990 B1 | 7/2015 | Yang |
| D740,847 S | 10/2015 | Yampolskiy et al. |
| D740,848 S | 10/2015 | Bolts et al. |
| D741,351 S | 10/2015 | Kito et al. |
| D746,832 S | 1/2016 | Pearcy et al. |
| 9,241,252 B2 | 1/2016 | Dua et al. |
| 9,244,899 B1 | 1/2016 | Greenbaum |
| 9,294,498 B1 | 3/2016 | Yampolskiy et al. |
| D754,690 S | 4/2016 | Park et al. |
| D754,696 S | 4/2016 | Follett et al. |
| 9,323,930 B1 | 4/2016 | Satish |
| D756,371 S | 5/2016 | Bertnick et al. |
| D756,372 S | 5/2016 | Bertnick et al. |
| D756,392 S | 5/2016 | Yun et al. |
| D757,070 S | 5/2016 | Dziuba |
| D759,073 S | 6/2016 | Winklevoss |
| D759,084 S | 6/2016 | Yampolskiy et al. |
| D759,689 S | 6/2016 | Olson et al. |
| 9,372,994 B1 | 6/2016 | Yampolskiy et al. |
| 9,373,144 B1 | 6/2016 | Ng et al. |
| D760,782 S | 7/2016 | Kendler et al. |
| 9,384,206 B1 | 7/2016 | Bono et al. |
| 9,401,926 B1 | 7/2016 | Dubow et al. |
| 9,407,658 B1 | 8/2016 | Kuskov et al. |
| 9,413,774 B1 | 8/2016 | Liu et al. |
| 9,420,049 B1 | 8/2016 | Talmor et al. |
| 9,424,333 B1 | 8/2016 | Bisignani et al. |
| 9,432,383 B2 | 8/2016 | Johns et al. |
| D766,952 S | 9/2016 | Gedrich et al. |
| 9,438,615 B2 | 9/2016 | Gladstone et al. |
| 9,479,526 B1 | 10/2016 | Yang |
| D771,103 S | 11/2016 | Eder |
| D771,695 S | 11/2016 | Yampolskiy et al. |
| D772,276 S | 11/2016 | Yampolskiy et al. |
| 9,501,647 B2 | 11/2016 | Yampolskiy et al. |
| D773,507 S | 12/2016 | Sagrillo et al. |
| D774,068 S | 12/2016 | Derby et al. |
| 9,530,016 B1 | 12/2016 | Pomerantz |
| D775,635 S | 1/2017 | Raji et al. |
| D776,136 S | 1/2017 | Chen et al. |
| D776,153 S | 1/2017 | Yampolskiy et al. |
| D777,177 S | 1/2017 | Chen et al. |
| 9,548,988 B1 | 1/2017 | Roundy et al. |
| 9,560,072 B1 | 1/2017 | Xu |
| D778,927 S | 2/2017 | Bertnick et al. |
| D778,928 S | 2/2017 | Bertnick et al. |
| D779,512 S | 2/2017 | Kimura et al. |
| D779,514 S | 2/2017 | Baris et al. |
| D779,531 S | 2/2017 | List et al. |
| 9,578,048 B1 | 2/2017 | Hunt et al. |
| D780,770 S | 3/2017 | Sum et al. |
| D785,009 S | 4/2017 | Lim et al. |
| D785,010 S | 4/2017 | Bachman et al. |
| D785,016 S | 4/2017 | Berwick et al. |
| 9,620,079 B2 | 4/2017 | Curtis |
| D787,530 S | 5/2017 | Huang |
| D788,128 S | 5/2017 | Wada |
| 9,641,547 B2 | 5/2017 | Yampolskiy et al. |
| 9,646,110 B2 | 5/2017 | Byrne et al. |
| D789,947 S | 6/2017 | Sun |
| D789,957 S | 6/2017 | Wu et al. |
| 9,680,855 B2 | 6/2017 | Schultz et al. |
| 9,680,858 B1 | 6/2017 | Boyer et al. |
| D791,153 S | 7/2017 | Rice et al. |
| D791,166 S | 7/2017 | Sandhu et al. |
| D791,834 S | 7/2017 | Eze et al. |
| D792,427 S | 7/2017 | Weaver et al. |
| D794,666 S | 8/2017 | Havaldar et al. |
| D794,667 S | 8/2017 | Havaldar et al. |
| D795,891 S | 8/2017 | Kohan et al. |
| 9,736,019 B2 | 8/2017 | Hardison et al. |
| 9,742,796 B1 | 8/2017 | Salsamendi |
| 9,747,570 B1 | 8/2017 | Vescio |
| 9,749,336 B1 | 8/2017 | Zhang et al. |
| D796,523 S | 9/2017 | Bhandari et al. |
| D797,138 S | 9/2017 | Reiter et al. |
| D801,989 S | 11/2017 | Iketsuki et al. |
| D803,237 S | 11/2017 | Wu et al. |
| 9,813,440 B1 | 11/2017 | Hoover et al. |
| 9,825,976 B1 | 11/2017 | Gomez et al. |
| 9,825,984 B1 | 11/2017 | Hoover et al. |
| D804,528 S | 12/2017 | Martin et al. |
| D806,735 S | 1/2018 | Olsen et al. |
| D806,737 S | 1/2018 | Chung et al. |
| D807,379 S | 1/2018 | Pahwa et al. |
| 9,880,710 B1 | 1/2018 | Mackinlay et al. |
| D809,523 S | 2/2018 | Lipka et al. |
| D809,989 S | 2/2018 | Lee et al. |

(56) References Cited

U.S. PATENT DOCUMENTS

| | | |
|---|---|---|
| D810,100 S | 2/2018 | Govindan Sankar Selvan et al. |
| D812,633 S | 3/2018 | Saneii |
| D814,483 S | 4/2018 | Gavaskar et al. |
| D815,119 S | 4/2018 | Chalker et al. |
| D815,148 S | 4/2018 | Martin et al. |
| D816,105 S | 4/2018 | Rudick et al. |
| D816,116 S | 4/2018 | Selassie |
| 9,954,893 B1 | 4/2018 | Zhao et al. |
| D817,970 S | 5/2018 | Chang et al. |
| D817,977 S | 5/2018 | Kato et al. |
| D818,475 S | 5/2018 | Yepez et al. |
| 9,973,524 B2 | 5/2018 | Boyer et al. |
| D819,687 S | 6/2018 | Yampolskiy et al. |
| D824,954 S | 8/2018 | Parfentieva et al. |
| 10,044,750 B2 | 8/2018 | Livshits et al. |
| D829,239 S | 9/2018 | Rehman |
| 10,079,854 B1 | 9/2018 | Scott et al. |
| 10,084,817 B2 | 9/2018 | Saher et al. |
| 10,142,364 B2 | 11/2018 | Baukes et al. |
| D835,631 S | 12/2018 | Yepez et al. |
| 10,180,966 B1 | 1/2019 | Lang et al. |
| 10,185,924 B1 | 1/2019 | McClintock et al. |
| 10,210,329 B1 | 2/2019 | Malik et al. |
| 10,217,071 B2 | 2/2019 | Mo et al. |
| 10,230,753 B2 | 3/2019 | Yampolskiy et al. |
| 10,230,764 B2 | 3/2019 | Ng et al. |
| 10,235,524 B2 | 3/2019 | Ford |
| 10,242,180 B2 | 3/2019 | Haefner et al. |
| D847,147 S | 4/2019 | Wesley et al. |
| D847,169 S | 4/2019 | Sombreireiro et al. |
| 10,257,219 B1 | 4/2019 | Geil et al. |
| 10,305,854 B2 | 5/2019 | Alizadeh-Shabdiz et al. |
| 10,331,502 B1 | 6/2019 | Hart |
| D853,413 S | 7/2019 | Hofner et al. |
| 10,339,321 B2 | 7/2019 | Tedeschi |
| 10,339,484 B2 | 7/2019 | Pai et al. |
| 10,348,755 B1 | 7/2019 | Shavell et al. |
| 10,412,083 B2 | 9/2019 | Zou et al. |
| D863,335 S | 10/2019 | Hardy et al. |
| D863,345 S | 10/2019 | Hardy et al. |
| D864,219 S | 10/2019 | Farnan et al. |
| 10,453,142 B2 | 10/2019 | Mun |
| 10,469,515 B2 | 11/2019 | Helmsen et al. |
| 10,482,239 B1 | 11/2019 | Liu et al. |
| 10,491,619 B2 | 11/2019 | Yampolskiy et al. |
| 10,491,620 B2 | 11/2019 | Yampolskiy et al. |
| 10,521,583 B1 | 12/2019 | Bagulho Monteiro Pereira |
| D872,574 S | 1/2020 | Deylamian et al. |
| 10,540,374 B2 | 1/2020 | Singh et al. |
| D874,506 S | 2/2020 | Kang et al. |
| 10,558,546 B2 | 2/2020 | Cranfill et al. |
| 10,572,945 B1 | 2/2020 | McNair |
| D880,512 S | 4/2020 | Greenwald et al. |
| D892,135 S | 8/2020 | Light et al. |
| 10,757,127 B2 | 8/2020 | Schultz et al. |
| D894,939 S | 9/2020 | Braica |
| 10,764,298 B1 | 9/2020 | Light et al. |
| 10,776,483 B2 | 9/2020 | Bagulho Monteiro Pereira |
| D900,145 S | 10/2020 | Malahy et al. |
| 10,796,260 B2 | 10/2020 | Brannon et al. |
| 10,805,331 B2 | 10/2020 | Boyer et al. |
| D903,693 S | 12/2020 | Li et al. |
| D905,712 S | 12/2020 | Li et al. |
| D905,730 S | 12/2020 | Newsom |
| D908,139 S | 1/2021 | Hardy et al. |
| 10,896,394 B2 | 1/2021 | Brannon et al. |
| D910,705 S | 2/2021 | Capela et al. |
| 10,909,488 B2 | 2/2021 | Hecht et al. |
| D914,719 S | 3/2021 | Ryan et al. |
| D914,732 S | 3/2021 | Fischbach |
| 10,949,543 B1 | 3/2021 | Bolukbas et al. |
| D918,955 S | 5/2021 | Madden, Jr. et al. |
| D920,343 S | 5/2021 | Bowland |
| D920,353 S | 5/2021 | Boutros et al. |
| D921,031 S | 6/2021 | Tessier et al. |
| D921,662 S | 6/2021 | Giannino et al. |
| D921,674 S | 6/2021 | Kmak et al. |
| D921,677 S | 6/2021 | Kmak et al. |
| D922,397 S | 6/2021 | Modi et al. |
| 11,023,585 B1 | 6/2021 | Light et al. |
| 11,032,244 B2 | 6/2021 | Dahlberg |
| D924,901 S | 7/2021 | Garg et al. |
| D924,909 S | 7/2021 | Nasu et al. |
| D931,867 S | 9/2021 | Okumura et al. |
| 11,122,073 B1 | 9/2021 | Cai et al. |
| 11,126,723 B2 | 9/2021 | Bagulho Monteiro Pereira |
| D940,742 S | 1/2022 | Vickers et al. |
| 11,222,388 B2 | 1/2022 | Baumgartner et al. |
| D946,596 S | 3/2022 | Ahmed |
| D947,238 S | 3/2022 | Nie et al. |
| D949,884 S | 4/2022 | Capela et al. |
| 11,334,832 B2 | 5/2022 | Dumoulin et al. |
| 11,379,773 B2 | 7/2022 | Vescio |
| D960,191 S | 8/2022 | Feit et al. |
| D960,924 S | 8/2022 | Nordstrom et al. |
| 11,455,322 B2 | 9/2022 | Yang et al. |
| D971,933 S | 12/2022 | Ahmed |
| D982,604 S | 4/2023 | Pacione et al. |
| D983,820 S | 4/2023 | Dunnette et al. |
| D987,668 S | 5/2023 | Mairs et al. |
| 11,652,834 B2 | 5/2023 | Gladstone et al. |
| D991,943 S | 7/2023 | Fawcett et al. |
| 11,727,114 B2 | 8/2023 | Bagulho Monteiro Pereira |
| 11,777,976 B2 | 10/2023 | Boyer et al. |
| D1,008,289 S | 12/2023 | Yazdansepas |
| D1,010,666 S | 1/2024 | Cai |
| D1,010,677 S | 1/2024 | Clymer |
| D1,014,517 S | 2/2024 | Russell |
| 11,949,655 B2 | 4/2024 | Dahlberg |
| 2001/0044798 A1 | 11/2001 | Nagral et al. |
| 2002/0083077 A1 | 6/2002 | Vardi |
| 2002/0133365 A1 | 9/2002 | Grey et al. |
| 2002/0164983 A1 | 11/2002 | Raviv et al. |
| 2003/0011601 A1 | 1/2003 | Itoh et al. |
| 2003/0050862 A1 | 3/2003 | Bleicken et al. |
| 2003/0074248 A1 | 4/2003 | Braud et al. |
| 2003/0123424 A1 | 7/2003 | Jung |
| 2003/0187967 A1 | 10/2003 | Walsh et al. |
| 2004/0003284 A1 | 1/2004 | Campbell et al. |
| 2004/0010709 A1 | 1/2004 | Baudoin et al. |
| 2004/0024859 A1 | 2/2004 | Bloch et al. |
| 2004/0088570 A1 | 5/2004 | Roberts et al. |
| 2004/0098375 A1 | 5/2004 | DeCarlo |
| 2004/0111358 A1 | 6/2004 | Lange et al. |
| 2004/0133561 A1 | 7/2004 | Burke |
| 2004/0133689 A1 | 7/2004 | Vasisht |
| 2004/0193907 A1 | 9/2004 | Patanella |
| 2004/0193918 A1 | 9/2004 | Green et al. |
| 2004/0199791 A1 | 10/2004 | Poletto et al. |
| 2004/0199792 A1 | 10/2004 | Tan et al. |
| 2004/0221296 A1 | 11/2004 | Ogielski et al. |
| 2004/0250122 A1 | 12/2004 | Newton |
| 2004/0250134 A1 | 12/2004 | Kohler et al. |
| 2005/0065754 A1 | 3/2005 | Schaf et al. |
| 2005/0065807 A1 | 3/2005 | DeAngelis et al. |
| 2005/0066195 A1 | 3/2005 | Jones |
| 2005/0071450 A1 | 3/2005 | Allen et al. |
| 2005/0076245 A1 | 4/2005 | Graham et al. |
| 2005/0080720 A1 | 4/2005 | Betz et al. |
| 2005/0108415 A1 | 5/2005 | Turk et al. |
| 2005/0131830 A1 | 6/2005 | Juarez et al. |
| 2005/0138413 A1 | 6/2005 | Lippmann et al. |
| 2005/0160002 A1 | 7/2005 | Roetter et al. |
| 2005/0228899 A1 | 10/2005 | Wendkos et al. |
| 2005/0234767 A1 | 10/2005 | Bolzman et al. |
| 2005/0278726 A1 | 12/2005 | Cano et al. |
| 2005/0278786 A1 | 12/2005 | Tippett et al. |
| 2006/0036335 A1 | 2/2006 | Banter et al. |
| 2006/0075490 A1 | 4/2006 | Boney et al. |
| 2006/0075494 A1 | 4/2006 | Bertman et al. |
| 2006/0107226 A1 | 5/2006 | Matthews et al. |
| 2006/0173992 A1 | 8/2006 | Weber et al. |
| 2006/0212925 A1 | 9/2006 | Shull et al. |
| 2006/0230039 A1 | 10/2006 | Shull et al. |

(56) References Cited

U.S. PATENT DOCUMENTS

| | | |
|---|---|---|
| 2006/0253458 A1 | 11/2006 | Dixon et al. |
| 2006/0253581 A1 | 11/2006 | Dixon et al. |
| 2006/0271564 A1 | 11/2006 | Meng Muntz et al. |
| 2007/0016948 A1 | 1/2007 | Dubrovsky et al. |
| 2007/0067845 A1 | 3/2007 | Wiemer et al. |
| 2007/0113282 A1 | 5/2007 | Ross |
| 2007/0136622 A1 | 6/2007 | Price et al. |
| 2007/0143851 A1 | 6/2007 | Nicodemus et al. |
| 2007/0174915 A1 | 7/2007 | Gribble et al. |
| 2007/0179955 A1 | 8/2007 | Croft et al. |
| 2007/0198275 A1 | 8/2007 | Malden et al. |
| 2007/0214151 A1 | 9/2007 | Thomas et al. |
| 2007/0282730 A1 | 12/2007 | Carpenter et al. |
| 2008/0017526 A1 | 1/2008 | Prescott et al. |
| 2008/0033775 A1 | 2/2008 | Dawson et al. |
| 2008/0047018 A1 | 2/2008 | Baudoin et al. |
| 2008/0091834 A1 | 4/2008 | Norton |
| 2008/0097980 A1 | 4/2008 | Sullivan |
| 2008/0127338 A1 | 5/2008 | Cho et al. |
| 2008/0140495 A1 | 6/2008 | Bhamidipaty et al. |
| 2008/0140728 A1 | 6/2008 | Fraser et al. |
| 2008/0148408 A1 | 6/2008 | Kao et al. |
| 2008/0162931 A1 | 7/2008 | Lord et al. |
| 2008/0172382 A1 | 7/2008 | Prettejohn |
| 2008/0175266 A1 | 7/2008 | Alperovitch et al. |
| 2008/0208995 A1 | 8/2008 | Takahashi et al. |
| 2008/0209565 A2 | 8/2008 | Baudoin et al. |
| 2008/0222287 A1 | 9/2008 | Bahl et al. |
| 2008/0222736 A1 | 9/2008 | Boodaei et al. |
| 2008/0262895 A1 | 10/2008 | Hofmeister et al. |
| 2008/0270458 A1 | 10/2008 | Gvelesiani |
| 2009/0019525 A1 | 1/2009 | Yu et al. |
| 2009/0024663 A1 | 1/2009 | McGovern |
| 2009/0044272 A1 | 2/2009 | Jarrett |
| 2009/0064337 A1 | 3/2009 | Chien |
| 2009/0094265 A1 | 4/2009 | Vlachos et al. |
| 2009/0094697 A1 | 4/2009 | Provos et al. |
| 2009/0125427 A1 | 5/2009 | Atwood et al. |
| 2009/0132861 A1 | 5/2009 | Costa et al. |
| 2009/0147026 A1 | 6/2009 | Buck et al. |
| 2009/0150999 A1 | 6/2009 | Dewey et al. |
| 2009/0161629 A1 | 6/2009 | Purkayastha et al. |
| 2009/0193054 A1 | 7/2009 | Karimisetty et al. |
| 2009/0204235 A1 | 8/2009 | Dubinsky |
| 2009/0216700 A1 | 8/2009 | Bouchard et al. |
| 2009/0228830 A1 | 9/2009 | Herz et al. |
| 2009/0265787 A9 | 10/2009 | Baudoin et al. |
| 2009/0276835 A1 | 11/2009 | Jackson et al. |
| 2009/0293128 A1 | 11/2009 | Lippmann et al. |
| 2009/0299802 A1 | 12/2009 | Brennan |
| 2009/0300768 A1 | 12/2009 | Krishnamurthy et al. |
| 2009/0319420 A1 | 12/2009 | Sanchez et al. |
| 2009/0323632 A1 | 12/2009 | Nix |
| 2009/0328063 A1 | 12/2009 | Corvera et al. |
| 2010/0017880 A1 | 1/2010 | Masood |
| 2010/0024033 A1 | 1/2010 | Kang et al. |
| 2010/0042605 A1 | 2/2010 | Cheng et al. |
| 2010/0057582 A1 | 3/2010 | Arfin et al. |
| 2010/0114634 A1 | 5/2010 | Christiansen et al. |
| 2010/0114757 A1 | 5/2010 | Jeng et al. |
| 2010/0180344 A1 | 7/2010 | Malyshev et al. |
| 2010/0186088 A1 | 7/2010 | Banerjee et al. |
| 2010/0205042 A1 | 8/2010 | Mun |
| 2010/0218256 A1 | 8/2010 | Thomas et al. |
| 2010/0235910 A1 | 9/2010 | Ku et al. |
| 2010/0251000 A1 | 9/2010 | Lyne et al. |
| 2010/0251371 A1 | 9/2010 | Brown |
| 2010/0262444 A1 | 10/2010 | Atwal et al. |
| 2010/0275263 A1 | 10/2010 | Bennett et al. |
| 2010/0281124 A1 | 11/2010 | Westman et al. |
| 2010/0281151 A1 | 11/2010 | Ramankutty et al. |
| 2010/0309206 A1 | 12/2010 | Xie et al. |
| 2011/0060950 A1 | 3/2011 | Waldron et al. |
| 2011/0099620 A1 | 4/2011 | Stavrou et al. |
| 2011/0106920 A1 | 5/2011 | Longo |
| 2011/0137704 A1 | 6/2011 | Mitra et al. |
| 2011/0145168 A1 | 6/2011 | Dirnstorfer et al. |
| 2011/0145576 A1 | 6/2011 | Bettan |
| 2011/0148880 A1 | 6/2011 | De Peuter |
| 2011/0185403 A1 | 7/2011 | Dolan et al. |
| 2011/0185427 A1 | 7/2011 | Aciicmez et al. |
| 2011/0213742 A1 | 9/2011 | Lemmond et al. |
| 2011/0219455 A1 | 9/2011 | Bhagwan et al. |
| 2011/0225085 A1 | 9/2011 | Takeshita et al. |
| 2011/0231395 A1 | 9/2011 | Vadlamani et al. |
| 2011/0239294 A1 | 9/2011 | Kim et al. |
| 2011/0239300 A1 | 9/2011 | Klein et al. |
| 2011/0249002 A1 | 10/2011 | Duplessis et al. |
| 2011/0276514 A1 | 11/2011 | Kalagnanam et al. |
| 2011/0282997 A1 | 11/2011 | Prince et al. |
| 2011/0289582 A1 | 11/2011 | Kejriwal et al. |
| 2011/0296519 A1 | 12/2011 | Ide et al. |
| 2012/0008974 A1 | 1/2012 | Kawai et al. |
| 2012/0036263 A1 | 2/2012 | Madden et al. |
| 2012/0036580 A1 | 2/2012 | Gorny et al. |
| 2012/0059823 A1 | 3/2012 | Barber et al. |
| 2012/0079596 A1 | 3/2012 | Thomas et al. |
| 2012/0089745 A1 | 4/2012 | Turakhia |
| 2012/0158725 A1 | 6/2012 | Molloy et al. |
| 2012/0159624 A1 | 6/2012 | Konig |
| 2012/0166458 A1 | 6/2012 | Laudanski et al. |
| 2012/0174219 A1 | 7/2012 | Hernandez et al. |
| 2012/0198558 A1 | 8/2012 | Liu et al. |
| 2012/0215892 A1 | 8/2012 | Wanser et al. |
| 2012/0221376 A1 | 8/2012 | Austin |
| 2012/0254993 A1 | 10/2012 | Sallam |
| 2012/0255021 A1 | 10/2012 | Sallam |
| 2012/0255027 A1 | 10/2012 | Kanakapura et al. |
| 2012/0290498 A1 | 11/2012 | Jones |
| 2012/0291129 A1 | 11/2012 | Shulman et al. |
| 2013/0014253 A1 | 1/2013 | Neou et al. |
| 2013/0055070 A1 | 2/2013 | Sacks et al. |
| 2013/0055386 A1 | 2/2013 | Kim et al. |
| 2013/0060351 A1 | 3/2013 | Imming et al. |
| 2013/0080341 A1 | 3/2013 | Veeramachaneni et al. |
| 2013/0080505 A1 | 3/2013 | Nielsen et al. |
| 2013/0086521 A1 | 4/2013 | Grossele et al. |
| 2013/0086681 A1 | 4/2013 | Jaroch |
| 2013/0086687 A1 | 4/2013 | Chess et al. |
| 2013/0091574 A1 | 4/2013 | Howes et al. |
| 2013/0124644 A1 | 5/2013 | Hunt et al. |
| 2013/0124653 A1 | 5/2013 | Vick et al. |
| 2013/0142050 A1 | 6/2013 | Luna |
| 2013/0145437 A1 | 6/2013 | Zaitsev |
| 2013/0173791 A1 | 7/2013 | Longo |
| 2013/0212479 A1 | 8/2013 | Willis et al. |
| 2013/0227078 A1 | 8/2013 | Wei et al. |
| 2013/0227697 A1 | 8/2013 | Zandani |
| 2013/0238527 A1 | 9/2013 | Jones |
| 2013/0263034 A1 | 10/2013 | Bruck et al. |
| 2013/0263270 A1 | 10/2013 | Cote et al. |
| 2013/0275176 A1 | 10/2013 | Brown et al. |
| 2013/0276056 A1 | 10/2013 | Epstein |
| 2013/0282406 A1 | 10/2013 | Snyder et al. |
| 2013/0291105 A1 | 10/2013 | Yan |
| 2013/0298244 A1 | 11/2013 | Kumar et al. |
| 2013/0305368 A1 | 11/2013 | Ford |
| 2013/0318594 A1 | 11/2013 | Hoy et al. |
| 2013/0333038 A1 | 12/2013 | Chien |
| 2013/0345978 A1 | 12/2013 | Lush et al. |
| 2013/0347116 A1 | 12/2013 | Flores et al. |
| 2014/0006129 A1 | 1/2014 | Heath |
| 2014/0019196 A1 | 1/2014 | Wiggins et al. |
| 2014/0040747 A1 | 2/2014 | Gardenfors |
| 2014/0052998 A1 | 2/2014 | Bloom et al. |
| 2014/0101006 A1 | 4/2014 | Pitt |
| 2014/0108474 A1 | 4/2014 | David et al. |
| 2014/0114755 A1 | 4/2014 | Mezzacca |
| 2014/0114843 A1 | 4/2014 | Klein et al. |
| 2014/0130158 A1 | 5/2014 | Wang et al. |
| 2014/0137254 A1 | 5/2014 | Ou et al. |
| 2014/0137257 A1 | 5/2014 | Martinez et al. |
| 2014/0146370 A1 | 5/2014 | Banner et al. |
| 2014/0173066 A1 | 6/2014 | Newton et al. |

(56) References Cited

U.S. PATENT DOCUMENTS

| | | |
|---|---|---|
| 2014/0173736 A1 | 6/2014 | Liu |
| 2014/0189098 A1 | 7/2014 | MaGill et al. |
| 2014/0189864 A1 | 7/2014 | Wang et al. |
| 2014/0204803 A1 | 7/2014 | Nguyen et al. |
| 2014/0206970 A1 | 7/2014 | Wesley et al. |
| 2014/0237545 A1 | 8/2014 | Mylavarapu et al. |
| 2014/0244317 A1 | 8/2014 | Roberts et al. |
| 2014/0282261 A1 | 9/2014 | Ranz et al. |
| 2014/0283056 A1 | 9/2014 | Bachwani et al. |
| 2014/0283067 A1 | 9/2014 | Call et al. |
| 2014/0283068 A1 | 9/2014 | Call et al. |
| 2014/0283069 A1 | 9/2014 | Call et al. |
| 2014/0288996 A1 | 9/2014 | Rence et al. |
| 2014/0304816 A1 | 10/2014 | Klein et al. |
| 2014/0330616 A1 | 11/2014 | Lyras |
| 2014/0334336 A1 | 11/2014 | Chen et al. |
| 2014/0337086 A1 | 11/2014 | Asenjo et al. |
| 2014/0337633 A1 | 11/2014 | Yang et al. |
| 2014/0344332 A1 | 11/2014 | Giebler |
| 2015/0033331 A1 | 1/2015 | Stern et al. |
| 2015/0033341 A1 | 1/2015 | Schmidtler et al. |
| 2015/0052607 A1 | 2/2015 | Al Hamami |
| 2015/0074579 A1 | 3/2015 | Gladstone et al. |
| 2015/0081860 A1 | 3/2015 | Kuehnel et al. |
| 2015/0088783 A1 | 3/2015 | Mun |
| 2015/0156084 A1 | 6/2015 | Kaminsky et al. |
| 2015/0180883 A1 | 6/2015 | Aktas et al. |
| 2015/0195299 A1 | 7/2015 | Zoldi et al. |
| 2015/0207776 A1 | 7/2015 | Morin et al. |
| 2015/0213259 A1 | 7/2015 | Du et al. |
| 2015/0248280 A1 | 9/2015 | Pillay et al. |
| 2015/0261955 A1 | 9/2015 | Huang et al. |
| 2015/0264061 A1 | 9/2015 | Ibatullin et al. |
| 2015/0288706 A1 | 10/2015 | Marshall |
| 2015/0288709 A1 | 10/2015 | Singhal et al. |
| 2015/0310188 A1 | 10/2015 | Ford et al. |
| 2015/0310213 A1 | 10/2015 | Ronen et al. |
| 2015/0317672 A1 | 11/2015 | Espinoza et al. |
| 2015/0331932 A1 | 11/2015 | Georges et al. |
| 2015/0339479 A1 | 11/2015 | Wang et al. |
| 2015/0347754 A1 | 12/2015 | Born |
| 2015/0347756 A1 | 12/2015 | Hidayat et al. |
| 2015/0350229 A1 | 12/2015 | Mitchell |
| 2015/0365587 A1 | 12/2015 | Ha et al. |
| 2015/0381649 A1 | 12/2015 | Schultz et al. |
| 2016/0014081 A1 | 1/2016 | Don, Jr. et al. |
| 2016/0023639 A1 | 1/2016 | Cajiga et al. |
| 2016/0028746 A1 | 1/2016 | Tonn |
| 2016/0036849 A1 | 2/2016 | Zakian |
| 2016/0065613 A1 | 3/2016 | Cho et al. |
| 2016/0078382 A1 | 3/2016 | Watkins et al. |
| 2016/0088015 A1 | 3/2016 | Sivan et al. |
| 2016/0104071 A1 | 4/2016 | Brueckner |
| 2016/0119373 A1 | 4/2016 | Fausto et al. |
| 2016/0134654 A1 | 5/2016 | Ghent |
| 2016/0140466 A1 | 5/2016 | Sidebottom et al. |
| 2016/0142419 A1 | 5/2016 | Antipa et al. |
| 2016/0142428 A1 | 5/2016 | Pastore et al. |
| 2016/0147992 A1 | 5/2016 | Zhao et al. |
| 2016/0162602 A1 | 6/2016 | Bradish et al. |
| 2016/0171415 A1 | 6/2016 | Yampolskiy et al. |
| 2016/0173520 A1 | 6/2016 | Foster et al. |
| 2016/0173522 A1 | 6/2016 | Yampolskiy et al. |
| 2016/0182537 A1 | 6/2016 | Tatourian et al. |
| 2016/0189301 A1 | 6/2016 | Ng et al. |
| 2016/0191554 A1 | 6/2016 | Kaminsky |
| 2016/0205126 A1 | 7/2016 | Boyer et al. |
| 2016/0212101 A1 | 7/2016 | Reshadi et al. |
| 2016/0239772 A1* | 8/2016 | Dahlberg ............... G06F 16/23 |
| 2016/0241560 A1 | 8/2016 | Reshadi et al. |
| 2016/0248797 A1 | 8/2016 | Yampolskiy et al. |
| 2016/0248800 A1 | 8/2016 | Ng et al. |
| 2016/0253500 A1 | 9/2016 | Alme et al. |
| 2016/0259945 A1 | 9/2016 | Yampolskiy et al. |
| 2016/0291860 A1 | 10/2016 | Higuchi et al. |
| 2016/0335232 A1 | 11/2016 | Born et al. |
| 2016/0337387 A1 | 11/2016 | Hu et al. |
| 2016/0344769 A1 | 11/2016 | Li |
| 2016/0344801 A1 | 11/2016 | Akkarawittayapoom |
| 2016/0359875 A1 | 12/2016 | Kim et al. |
| 2016/0364496 A1 | 12/2016 | Li |
| 2016/0373485 A1 | 12/2016 | Kamble |
| 2016/0378978 A1 | 12/2016 | Singla et al. |
| 2017/0048267 A1 | 2/2017 | Yampolskiy et al. |
| 2017/0063901 A1 | 3/2017 | Muddu et al. |
| 2017/0063923 A1 | 3/2017 | Yang et al. |
| 2017/0104783 A1 | 4/2017 | Vanunu et al. |
| 2017/0126719 A1 | 5/2017 | Mason |
| 2017/0142148 A1 | 5/2017 | Bu Er et al. |
| 2017/0161253 A1 | 6/2017 | Silver |
| 2017/0161409 A1 | 6/2017 | Martin |
| 2017/0161859 A1 | 6/2017 | Baumgartner et al. |
| 2017/0213292 A1 | 7/2017 | Sweeney et al. |
| 2017/0221072 A1 | 8/2017 | AthuluruTlrumala et al. |
| 2017/0223002 A1 | 8/2017 | Sabin et al. |
| 2017/0236078 A1 | 8/2017 | Rasumov |
| 2017/0237764 A1 | 8/2017 | Rasumov |
| 2017/0264623 A1 | 9/2017 | Ficarra et al. |
| 2017/0277892 A1 | 9/2017 | MacDermid |
| 2017/0279843 A1 | 9/2017 | Schultz et al. |
| 2017/0289109 A1 | 10/2017 | Caragea |
| 2017/0300911 A1 | 10/2017 | Alnajem |
| 2017/0316324 A1 | 11/2017 | Barrett et al. |
| 2017/0318045 A1 | 11/2017 | Johns et al. |
| 2017/0324555 A1 | 11/2017 | Wu et al. |
| 2017/0324766 A1 | 11/2017 | Gonzalez |
| 2017/0337487 A1 | 11/2017 | Nock et al. |
| 2018/0013716 A1 | 1/2018 | Connell et al. |
| 2018/0041521 A1 | 2/2018 | Zhang et al. |
| 2018/0052999 A1 | 2/2018 | Mitola, III |
| 2018/0088968 A1 | 3/2018 | Myhre et al. |
| 2018/0103043 A1 | 4/2018 | Kupreev et al. |
| 2018/0121659 A1 | 5/2018 | Sawhney et al. |
| 2018/0123934 A1 | 5/2018 | Gissing et al. |
| 2018/0124091 A1 | 5/2018 | Sweeney et al. |
| 2018/0124110 A1 | 5/2018 | Hunt et al. |
| 2018/0139180 A1 | 5/2018 | Napchi et al. |
| 2018/0146004 A1 | 5/2018 | Belfiore, Jr. et al. |
| 2018/0157468 A1 | 6/2018 | Stachura |
| 2018/0191768 A1 | 7/2018 | Broda et al. |
| 2018/0218157 A1 | 8/2018 | Price et al. |
| 2018/0219910 A1 | 8/2018 | Greenshpan et al. |
| 2018/0285414 A1 | 10/2018 | Kondiles et al. |
| 2018/0322584 A1 | 11/2018 | Crabtree et al. |
| 2018/0324201 A1 | 11/2018 | Lowry et al. |
| 2018/0330390 A1 | 11/2018 | Malaviya et al. |
| 2018/0332076 A1 | 11/2018 | Callahan et al. |
| 2018/0336348 A1 | 11/2018 | Ng et al. |
| 2018/0337938 A1 | 11/2018 | Kneib et al. |
| 2018/0337941 A1 | 11/2018 | Kraning et al. |
| 2018/0349641 A1 | 12/2018 | Barday et al. |
| 2018/0365519 A1 | 12/2018 | Pollard et al. |
| 2018/0375896 A1 | 12/2018 | Wang et al. |
| 2018/0375953 A1 | 12/2018 | Casassa Mont et al. |
| 2019/0034845 A1 | 1/2019 | Mo et al. |
| 2019/0052650 A1 | 2/2019 | Hu et al. |
| 2019/0065545 A1 | 2/2019 | Hazel et al. |
| 2019/0065748 A1 | 2/2019 | Foster et al. |
| 2019/0079869 A1 | 3/2019 | Baldi et al. |
| 2019/0089711 A1 | 3/2019 | Faulkner |
| 2019/0098025 A1 | 3/2019 | Lim |
| 2019/0124091 A1 | 4/2019 | Ujiie et al. |
| 2019/0140925 A1 | 5/2019 | Pon et al. |
| 2019/0141060 A1 | 5/2019 | Lim |
| 2019/0147378 A1 | 5/2019 | Mo et al. |
| 2019/0163914 A1 | 5/2019 | Steele et al. |
| 2019/0166152 A1 | 5/2019 | Steele et al. |
| 2019/0166156 A1 | 5/2019 | King-Wilson |
| 2019/0179490 A1 | 6/2019 | Barday et al. |
| 2019/0215331 A1 | 7/2019 | Anakata et al. |
| 2019/0238439 A1 | 8/2019 | Pugh et al. |
| 2019/0297106 A1 | 9/2019 | Geil et al. |
| 2019/0303574 A1 | 10/2019 | Lamay et al. |
| 2019/0303584 A1 | 10/2019 | Yang et al. |

(56) References Cited

U.S. PATENT DOCUMENTS

| | | |
|---|---|---|
| 2019/0362280 A1 | 11/2019 | Vescio |
| 2019/0379632 A1 | 12/2019 | Dahlberg et al. |
| 2019/0391707 A1 | 12/2019 | Ristow et al. |
| 2019/0392252 A1 | 12/2019 | Fighel et al. |
| 2020/0012794 A1 | 1/2020 | Saldanha et al. |
| 2020/0053127 A1 | 2/2020 | Brotherton et al. |
| 2020/0065213 A1 | 2/2020 | Poghosyan et al. |
| 2020/0074084 A1 | 3/2020 | Dorrans et al. |
| 2020/0092172 A1 | 3/2020 | Kumaran et al. |
| 2020/0097845 A1 | 3/2020 | Shaikh et al. |
| 2020/0104488 A1 | 4/2020 | Li et al. |
| 2020/0106798 A1 | 4/2020 | Lin |
| 2020/0120118 A1 | 4/2020 | Shu et al. |
| 2020/0125734 A1 | 4/2020 | Light et al. |
| 2020/0134175 A1* | 4/2020 | Marwah ............... G06F 9/542 |
| 2020/0183655 A1 | 6/2020 | Barday et al. |
| 2020/0186546 A1 | 6/2020 | Dichiu et al. |
| 2020/0234345 A1 | 7/2020 | Matheson et al. |
| 2020/0272763 A1 | 8/2020 | Brannon et al. |
| 2020/0285737 A1 | 9/2020 | Kraus et al. |
| 2020/0356689 A1 | 11/2020 | McEnroe et al. |
| 2020/0356695 A1 | 11/2020 | Brannon et al. |
| 2021/0064746 A1 | 3/2021 | Koide et al. |
| 2021/0073377 A1* | 3/2021 | Coull ................. G06N 20/00 |
| 2021/0089980 A1 | 3/2021 | Akey et al. |
| 2021/0241192 A1 | 8/2021 | Mullins et al. |
| 2021/0264488 A1 | 8/2021 | Barday |
| 2021/0297441 A1 | 9/2021 | Olalere |
| 2021/0312400 A1 | 10/2021 | Irimie et al. |
| 2021/0314364 A1 | 10/2021 | Brannon et al. |
| 2021/0329023 A1 | 10/2021 | Mohammad et al. |
| 2021/0342785 A1 | 11/2021 | Mann et al. |
| 2022/0083692 A1 | 3/2022 | Maduranthakam Kidambi Sridhar et al. |
| 2022/0191232 A1 | 6/2022 | Cai et al. |
| 2022/0335136 A1 | 10/2022 | Sabourin et al. |
| 2022/0405739 A1 | 12/2022 | Sindhu et al. |
| 2023/0030077 A1 | 2/2023 | Park et al. |
| 2023/0308449 A1 | 9/2023 | Sirkin |

OTHER PUBLICATIONS

U.S. Appl. No. 16/360,641, U.S. Pat. No. 11,200,323, Systems and Methods for Forecasting Cybersecurity Ratings Based on Event-Rate Scenarios, filed Mar. 21, 2019.
U.S. Appl. No. 17/523,166, Published as US 2022/0121753, Systems and Methods for Forecasting Cybersecurity Ratings Based on Event-Rate Scenarios, filed Nov. 10, 2021.
U.S. Appl. No. 16/922,672, U.S. Pat. No. 11,030,325, Systems and Methods for Generating Security Improvement Plans for Entities, filed Jul. 7, 2020.
U.S. Appl. No. 17/307,577, Published as: US2021/0326449, Systems and Methods for Generating Security Improvement Plans for Entities, filed May 4, 2021.
U.S. Appl. No. 29/677,306, U.S. Pat. No. D. 905,702, Computer Display With Corporate Hierarchy Graphical User Interface Computer Display With Corporate Hierarchy Graphical User Interface, filed Jan. 18, 2019.
U.S. Appl. No. 17/018,587, U.S. Pat. No. 11,050,779, Systems and Methods for Assessing Cybersecurity State of Entities Based on Computer Network, filed Sep. 11, 2020.
"Agreed Upon Procedures," Version 4.0, BITS, The Financial Institution Shared Assessments Program, Assessment Guide, Sep. 2008, 56 pages.
"Amazon Mechanical Turk," accessed on the internet at https://www.mturk.com/; 7 pages.
"An Executive View of IT Governance," IT Governance Institute, 2009, 32 pages.
"Assessing Risk in Turbulent Times," A Workshop for Information Security Executives, Glassmeyter/McNamee Center for Digital Strategies, Tuck School of Business at Dartmouth, Institute for Information Infrastructure Protection, 2009, 17 pages.
"Assuring a Trusted and Resilient Information and Communications Infrastructure," Cyberspace Policy Review, May 2009, 76 pages.
"Computer Network Graph," http://www.opte.org; 1 page.
"Creating Transparency with Palantir," accessed on the internet at https://www.youtube.com/watch?v=8cbGChfagUA; Jul. 5, 2012; 1 page.
"Master Security Criteria," Version 3.0, BITS Financial Services Security Laboratory, Oct. 2001, 47 pages.
"Neo4j (neo4j.com)," accessed on the internet at https://web.archive.org/web/20151220150341/http://neo4j.com:80/developer/guide-data-visualization/; Dec. 20, 2015; 1 page.
"Palantir Cyber: Uncovering malicious behavior at petabyte scale," accessed on the internet at https://www.youtube.com/watch?v=EhYezV06EE; Dec. 21, 2012; 1 page.
"Palantir.com," accessed on the internet at http://www.palantir.com/; Dec. 2015; 2 pages.
"Plugging the Right Holes," Lab Notes, MIT Lincoln Library, Posted Jul. 2008, retrieved Sep. 14, 2010 from http://www.ll.miLedufpublicationsflabnotesfpluggingtherightho!. . . , 2 pages.
"Rapid7 Nexpose Vulnerability Scanner," accessed on the internet at https://www.rapid7.com/products/nexpose/download/, 3 pages.
"Report on Controls Placed in Operation and Test of Operating Effectiveness," EasCorp, Jan. 1 through Dec. 31, 2008, prepared by Crowe Horwath, 58 pages.
"Shared Assessments: Getting Started," BITS, 2008, 4 pages.
"Tenable Nessus Network Vulnerability Scanner," accessed on the internet at https://www.tenable.com/products/nessus/nessus-professional; 13 paqes.
"Twenty Critical Controls for Effective Cyber Defense: Consensus Audit," Version 2.3, Nov. 13, 2009, retrieved on Apr. 9, 2010 from http://www.sans.org/critical-security-controls/print.php., 52 pages.
2009 Data Breach Investigations Report, study conducted by Verizon Business RISK Team, 52 pages.
Application as filed, pending claims of U.S. Appl. No. 13/240,572 as of Nov. 18, 2015, 45 pages.
Artz, Michael Lyle, "NetSPA: A Network Security Planning Architecture," Massachusetts Institute of Technology, May 24, 2002, 97 pages.
Azman, Mohamed et al. Wireless Daisy Chain and Tree Topology Networks for Smart Cities. 2019 IEEE International Conference on Electrical, Computer and Communication Technologies (ICECCT). https://ieeexplore.ieee.org/stamp/stamp.jsp?tp=&arnumber=8869252 (Year: 2019).
Basinya, Evgeny A.; Yushmanov, Anton A. Development of a Comprehensive Security System. 2019 Dynamics of Systems, Mechanisms and Machines (Dynamics). https://ieeexplore.ieee.org/stamp/stamp.jsp?tp=&arnumber=8944700 (Year: 2019).
Bhilare et al., "Protecting Intellectual Property and Sensitive Information in Academic Campuses from Trusted Insiders: Leveraging Active Directory", SIGUCC, Oct. 2009 (5 pages).
BitSight, "Cyber Security Myths Versus Reality: How Optimism Bias Contributes to Inaccurate Perceptions of Risk", Jun. 2015, Dimensional Research, pp. 1-9.
Borgatti, et al., "On Social Network Analysis in a Supply Chain Context," Journal of Supply Chain Management; 45(2): 5-22; Apr. 2009, 18 pages.
Boyer, Stephen, et al., Playing with Blocks: SCAP-Enable Higher-Level Analyses, MIT Lincoln Laboratory, 5th Annual IT Security Automation Conference, Oct. 26-29, 2009, 35 pages.
Browne, Niall, et al., "Shared Assessments Program AUP and SAS70 Frequently Asked Questions," BITS, 4 pages.
Buckshaw, Donald L., "Use of Decision Support Techniques for Information System Risk Management," submitted for publication in Wiley's Encyclopedia of Quantitative Risk Assessment in Jan. 2007, 11 pages.
Buehler, Kevin S., et al., "Running with risk," The McKinsey Quarterly, No. 4, 2003, pp. 40-49.
Camelo, "Botnet Cluster Identification," Sep. 2014, 90 pages.
Camelo, "Condenser: A Graph-based Approach for Detecting Botnets," AnubisNetworks R&D, Amadora, Portugal and CENTRIA, Universidade NOVA de Lisboa, Portugal (p. 8) Oct. 31, 2014.

(56) References Cited

OTHER PUBLICATIONS

Carstens, et al., "Modeling Company Risk and Importance in Supply Graphs," European Semantic Web Conference 2017: The Semantic Web pp. 18-31.
Chernyshev, M. et al., "On 802.11 Access Point Locatability and Named Entity Recognition in Service Set Identifiers", IEEE Trans. on Info. and Sec., vol. 11 No. 3 (Mar. 2016).
Chu, Matthew, et al., "Visualizing Attack Graphs, Reachability, and Trust Relationships with NAVIGATOR," MIT Lincoln Library, VizSEC '10, Ontario, Canada, Sep. 14, 2010, 12 pages.
Chuvakin, "SIEM: Moving beyond compliance", RSA White Paper (2010) (16 pages).
Computer Network Graph—Bees, http://bioteams.com/2007/04/30/visualizing_complex_networks.html, date accessed Sep. 28, 2016, 2 pages.
Computer Network Graph—Univ. of Michigan, http://people.cst.cmich.edu/liao1q/research.shtml, date accessed Sep. 28, 2016, 5 pages.
Crowther, Kenneth G., et al., "Principles for Better Information Security through More Accurate, Transparent Risk Scoring," Journal of Homeland Security and Emergency Management, vol. 7, Issue 1, Article 37, 2010, 20 pages.
Davis, Lois M., et al., "The National Computer Security Survey (NCSS) Final Methodology," Technical report prepared for the Bureau of Justice Statistics, Safety and Justice Program, RAND Infrastructure, Safety and Environment (ISE), 2008, 91 pages.
Dillon-Merrill, PhD., Robin L, et al., "Logic Trees: Fault, Success, Attack, Event, Probability, and Decision Trees," Wiley Handbook of Science and Technology for Homeland Security, 13 pages.
Dun & Bradstreet Corp. Stock Report, Standard & Poor's, Jun. 6, 2009, 8 pages.
Dun & Bradstreet, The DUNSRight Quality Process: Power Behind Quality Information, 24 pages.
Edmonds, Robert, "ISC Passive DNS Architecture", Internet Systems Consortium, Inc., Mar. 2012, 18 pages.
Equifax Inc. Stock Report, Standard & Poor's, Jun. 6, 2009, 8 pages.
Gephi (gephi.org), accessed on the internet at https://web.archive.org/web/20151216223216/https://gephi.org/; Dec. 16, 2015; 1 page.
Gilgur, et al., "Percentile-Based Approach to Forecasting Workload Growth" Proceedings of CMG'15 Performance and Capacity International Conference by the Computer Measurement Group. No. 2015 (Year:2015), 16 pages.
Gundert, Levi, "Big Data in Security—Part III: Graph Analytics," accessed on the Internet at https://blogs.cisco.com/security/big-data-in-security-part-iii-graph-analytics; Cisco Blog, Dec. 2013, 8 pages.
Hachem, Sara; Toninelli, Alessandra; Pathak, Animesh; Issany, Valerie. Policy-Based Access Control in Mobile Social Ecosystems. 2011 IEEE International Symposium on Policies for Distributed Systems and Networks (POLICY). Http://ieeexplore.ieee.org/stamp/stamp.jsp?arnumber=5976796. 8 pages.
Hacking Exposed 6, S. McClure et al., copyright 2009, 37 pages.
Ingols, Kyle, et al., "Modeling Modern Network Attacks and Countermeasures Using Attack Graphs," MIT Lincoln Laboratory, 16 pages.
Ingols, Kyle, et al., "Practical Attack Graph Generation for Network Defense," MIT Lincoln Library, IEEE Computer Society, Proceedings of the 22nd Annual Computer Security Applications Conference (ACSAC'06), 2006, 10 pages.
Ingols, Kyle, et al., "Practical Experiences Using SCAP to Aggregate CND Data," MIT Lincoln Library, Presentation to Nist Scap Conference, Sep. 24, 2008, 59 pages.
Jean, "Cyber Security: How to use graphs to do an attack analysis," accessed on the internet at https://linkurio.US/blog/cyber-security-use-graphs-attack-analysis/; Aug. 2014, 11 pages.
Jin et al, "Identifying and tracking suspicious activities through IP gray space analysis", MineNet, Jun. 12, 2007 (6 pages).
Johnson, Eric, et al., "Information Risk and the Evolution of the Security Rating Industry," Mar. 24, 2009, 27 pages.
Joslyn, et al., "Massive Scale Cyber Traffic Analysis: A Driver for Graph Database Research," Proceedings of the First International Workshop on Graph Data Management Experience and Systems (GRADES 2013), 6 pages.
KC Claffy, "Internet measurement and data analysis: topology, workload, performance and routing statistics," accessed on the Internet at http://www.caida.org/publications/papers/1999/Nae/Nae.html., NAE '99 workshop, 1999, 22 pages.
Li et al., "Finding the Linchpins of the Dark Web: a Study on Topologically Dedicated Hosts on Malicious Web Infrastructures", IEEE, 2013 (15 pages).
Lippmann, Rich, et al., NetSPA: a Network Security Planning Architecture, MIT Lincoln Laboratory, 11 pages.
Lippmann, Richard, et al., "Validating and Restoring Defense in Depth Using Attack Graphs," MIT Lincoln Laboratory, 10 pages.
Lippmann, RP., et al., "An Annotated Review of Papers on Attack Graphs," Project Report IA-1, Lincoln Laboratory, Massachusetts Institute of Technology, Mar. 31, 2005, 39 pages.
Lippmann, RP., et al., "Evaluating and Strengthening Enterprise Network Security Using Attack Graphs," Project Report IA-2, MIT Lincoln Laboratory, Oct. 5, 2005, 96 pages.
Luo, Hui; Henry, Paul. A Secure Public Wireless LAN Access Technique That Supports Walk-Up Users. GLOBECOM '03. IEEE Global Telecommunications Conference. https://ieeexplore.ieee.org/stamp/stamp.jsp?tp=&arnumber=1258471 (Year: 2003).
Maltego XL, accessed on the Internet at https://www.paterva.com/web7/buy/maltego-clients/maltego-xl.php, 5 pages.
Massimo Candela, "Real-time BGP Visualisation with BGPlay," accessed on the Internet at https://labs.ripe.net/Members/massimo_candela/real-time-bgp-visualisationwith-bgplay), Sep. 30, 2015, 8 pages.
Maxmind, https://www.maxmind.com/en/about-maxmind, https://www.maxmind.com/en/geoip2-isp-database, date accessed Sep. 28, 20116, 3 pages.
McNab, "Network Security Assessment," copyright 2004, 13 pages.
McNab, "Network Security Assessment," copyright 2004, 56 pages.
Method Documentation, CNSS Risk Assessment Tool Version 1.1, Mar. 31, 2009, 24 pages.
Mile 2 CPTE Maltego Demo, accessed on the internet at https://www.youtube.com/watch?v=o2oNKOUzPOU; Jul. 12, 2012; 1 page.
Moradi, et al., "Quantitative Models for Supply Chain Management," IGI Global, 2012, 29 pages.
Morningstar Direct, dated to 11/12/202, morningstardirect.com [online]. Retrieved Feb. 26, 2021 from internet <URL:https://web.archive.org/web/20201112021943/https://www.morningstar.com/products/direct> (Year: 2020).
Netcraft, www.netcraft.com, date accessed Sep. 28, 2016, 2 pages.
NetScanTools Pro, http://www.netscantools.com/nstpromain.html, date accessed Sep. 28, 2016, 2 pages.
Network Security Assessment, C. McNab, copyright 2004, 13 pages.
Noel, et al., "Big-Data Architecture for Cyber Attack Graphs, Representing Security Relationships in NoSQL Graph Databases," The MITRE Corporation, 2014, 6 pages.
Nye, John, "Avoiding Audit Overlap," Moody's Risk Services, Presentation, Source Boston, Mar. 14, 2008, 19 pages.
Pending claims for U.S. Appl. No. 14/021,585, as of Apr. 29, 2016, 2 pages.
Pending claims for U.S. Appl. No. 14/021,585, as of Nov. 18, 2015, 6 pages.
U.S. Appl. No. 13/240,572 and pending claims as of Mar. 22, 2016, 10 pages.
U.S. Appl. No. 13/240,572 as of Oct. 7, 2015, application as filed and pending claims, 45 pages.
U.S. Appl. No. 14/021,585 and pending claims as of Mar. 22, 2016, 2 pages.
U.S. Appl. No. 14/021,585 as of Oct. 7, 2015 and application as filed, 70 pages.
U.S. Appl. No. 14/944,484 and pending claims as of Mar. 22, 2016, 4 pages.
U.S. Appl. No. 61/386,156 as of Oct. 7, 2015. 2 pages.
Application as filed and pending claims for U.S. Appl. No. 13/240,572 as of Apr. 29, 2016, 46 pages.

(56) References Cited

OTHER PUBLICATIONS

Application as filed and pending claims for U.S. Appl. No. 14/944,484 as of Apr. 29, 2016, 4 pages.
Paxson, Vern, "How The Pursuit of Truth Led Me To Selling Viagra," EECS Department, University of California, International Computer Science Institute, Lawrence Berkeley National Laboratory, Aug. 13, 2009, 68 pages.
Proposal and Award Policies and Procedures Guide, Part I—Proposal Preparation & Submission Guidelines GPG, The National Science Foundation, Feb. 2009, 68 pages.
Provos et al., "The Ghost In the Browser Analysis of Web-based Malware", 2007 (9 pages).
Rare Events, Oct. 2009, JASON, The MITRE Corporation, Oct. 2009, 104 pages.
Rees, L. P. et al., "Decision support for cybersecurity risk planning." Decision Support Systems 51.3 (2011): pp. 493-505.
Report to the Congress on Credit Scoring and Its Effects on the Availability and Affordability of Credit, Board of Governors of the Federal Reserve System, Aug. 2007, 304 pages.
RFC 1834, https://tools.ietf.org/html/rfc1834, date accessed Sep. 28, 2016, 7 pages.
RFC 781, https://tools.ietf.org/html/rfc781, date accessed Sep. 28, 2016, 3 pages.
RFC 950, https://tools.ietf.org/html/rfc950, date accessed Sep. 28, 2016, 19 pages.
RFC 954, https://tools.ietf.org/html/rfc954, date accessed Sep. 28, 2016, 5 pages.
SamSpade Network Inquiry Utility, https://www.sans.org/reading-room/whitepapers/tools/sam-spade-934, date accessed Sep. 28, 2016, 19 pages.
Santos, J. R. et al., "A framework for linking cybersecurity metrics to the modeling of macroeconomic interdependencies." Risk Analysis: An International Journal (2007) 27.5, pp. 1283-1297.
SBIR Phase I: Enterprise Cyber Security Scoring, CyberAnalytix, LLC, http://www.nsf.gov/awardsearch/showAward.do?AwardNumber=1013603, Apr. 28, 2010, 2 pages.
Search Query Report form IP.com (performed Apr. 27, 2020).
Search Query Report from IP.com (performed Jul. 29, 2022).
Security Warrior, Cyrus Peikari, Anton, Chapter 8: Reconnaissance, 6 pages.
Seigneur et al., A Survey of Trust and Risk Metrics for a BYOD Mobile Worker World: Third International Conference on Social Eco-Informatics, 2013, 11 pages.
Seneviratne et al., "SSIDs in the Wild: Extracting Semantic Information from WiFi SSIDs" HAL archives-ouvertes.fr, HAL Id: hal-01181254, Jul. 29, 15, 5 pages.
Snort Intrusion Monitoring System, http://archive.oreilly.com/pub/h/1393, date accessed Sep. 28, 2016, 3 pages.
Srivastava, Divesh; Velegrakis, Yannis. Using Queries to Associate Metadata with Data. IEEE 23rd International Conference on Data Engineering. Pub. Date: 2007. http://ieeexplore.ieee.org/stamp/stamp.jsp?arnumber=4221823, 3 pages.
Stone-Gross, Brett, et al., "FIRE: Finding Rogue Networks," 10 pages.
Taleb, Nassim N., et al., "The Six Mistakes Executives Make in Risk Management," Harvard Business Review, Oct. 2009, 5 pages.
The CIS Security Metrics v1.0.0, The Center for Internet Security, May 11, 2009, 90 pages.
The Dun & Bradstreet Corp. Stock Report, Standard & Poor's, Jun. 6, 2009, 8 pages.
The Fair Credit Reporting Act (FCRA) of the Federal Trade Commission (FTC), Jul. 30, 2004, 86 pages.
The Financial Institution Shared Assessments Program, Industry Positioning and Mapping Document, BITS, Oct. 2007, 44 pages.
Wagner, et al., "Assessing the vulnerability of supply chains using graph theory," Int. J. Production Economics 126 (2010) 121-129.
Wikipedia, https://en.wikipedia.org/wiki/Crowdsourcing, date accessed Sep. 28, 2016, 25 pages.
Williams, Leevar, et al., "An Interactive Attack Graph Cascade and Reachability Display," MIT Lincoln Laboratory, 17 pages.
Williams, Leevar, et al., "GARNET: A Graphical Attack Graph and Reachability Network Evaluation Tool," MIT Lincoln Library, VizSEC 2009, pp. 44-59.
Winship, C., "Models for sample selection bias", Annual review of sociology, 18(1) (Aug. 1992), pp. 327-350.
U.S. Appl. No. 15/377,574 U.S. Pat. No. 9,705,932, Methods and Systems for Creating, De-Duplicating, and Accessing Data Using an Object Storage System, filed Dec. 13, 2016.
U.S. Appl. No. 16/405,121 U.S. Pat. No. 10,785,245 Published as: US2019/0260791, filed May 7, 2019.
U.S. Appl. No. 17/025,930 U.S. Pat. No. 11,652,834 Published as: US2021/0006581, filed Sep. 18, 2020.
U.S. Appl. No. 18/297,863 Published as: US2023/0247041, filed Apr. 10, 2023.
U.S. Appl. No. 13/240,572 U.S. Pat. No. 10,805,331 Published as: US2016/0205126, filed Sep. 2011.
U.S. Appl. No. 14/944,484 U.S. Pat. No. 9,973,524 Published as: US2016/0323308, filed Nov. 18, 2015.
U.S. Appl. No. 17/069,151 U.S. Pat. No. 11,777,976 Published as: US2021/0211454, filed Oct. 13, 2020.
U.S. Appl. No. 18/453,488 U.S. Pat. No. 12,010,137, Published as: US2023/0403295, filed Aug. 22, 2023.
U.S. Appl. No. 18/461,087 U.S. Pat. No. 11,882,146 Published as: US2023/0421600, Information Technology Security Assessment System, filed Sep. 5, 2023.
U.S. Appl. No. 18/637,577, Information Technology Security Assessment System, filed Apr. 17, 2024.
U.S. Appl. No. 15/134,845 U.S. Pat. No. 9,680,858, Annotation Platform for a Security Risk System, filed April 21, 2016.
U.S. Appl. No. 15/044,952 U.S. Pat. No. 11,182,720 Published as: US2017/0236077, Relationships Among Technology Assets and Services and the Entities Responsible for Them, filed Feb. 16, 2016.
U.S. Appl. No. 15/089,375 U.S. Pat. No. 10,176,445 Published as: US2017/0236079, Relationships Among Technology Assets and Services and the Entities Responsible for Them, filed Apr. 1, 2016.
U.S. Appl. No. 29/598,298 U.S. Pat. No. D. 835,631, Computer Display Screen With Graphical User Interface, filed Mar. 24, 2017.
U.S. Appl. No. 29/598,299 U.S. Pat. No. D. 818,475, Computer Display With Security Ratings Graphical User Interface, filed Mar. 24, 2017.
U.S. Appl. No. 29/599,622, U.S. Pat. No. D. 847,169, Computer Display With Security Ratings Graphical User Interface, filed Apr. 5, 2017.
U.S. Appl. No. 29/599,620 U.S. Pat. No. D. 846,562, Computer Display With Security Ratings Graphical User Interface, filed Apr. 5, 2017.
U.S. Appl. No. 17/401,683 U.S. Pat. No. 11,727,114 Published as: US2021/0374243, Systems and Methods for Remote Detection of Software Through Browser Webinjects, filed Aug. 13, 2021.
U.S. Appl. No. 29/666,942 U.S. Pat. No. D. 892,135, Computer Display With Graphical User Interface, filed Oct. 17, 2018.
U.S. Appl. No. 17/523,166 U.S. Pat. No. 11,783,052 Published as: US2022/0121753, Systems and Methods for Forecasting Cybersecurity Ratings Based on Event-Rate Scenarios, filed Nov. 10, 2021.
U.S. Appl. No. 16/922,673 U.S. Pat. No. 11,030,325 Published as: US2021/0019424, Systems and Methods for Generating Security Improvement Plans for Entities, filed Jul. 7, 2020.
U.S. Appl. No. 18/138,803 Published as US2023/0267215, Systems and Methods for Generating Security Improvement Plans for Entities, filed Apr. 25, 2023.
U.S. Appl. No. 29/677,306 U.S. Pat. No. D. 905,702, Computer Display Screen With Corporate Hierarchy Graphical User Interface, filed Jan. 18, 2019.
U.S. Appl. No. 17/132,512 U.S. Pat. No. 11,595,427 Published as: US2021/0243221, Systems and Methods for Rapidly Generating Security Ratings, filed Dec. 23, 2020.
U.S. Appl. No. 17/119,822 U.S. Pat. No. 11,122,073, Systems and Methods for Cybersecurity Risk Mitigation and Management, filed Dec. 11, 2020.
U.S. Appl. No. 29/815,855 U.S. Pat. No. D. 1,010,666, Computer Display With a Graphical User Interface for Cybersecurity Risk Management, filed Nov. 17, 2021.

(56) References Cited

OTHER PUBLICATIONS

U.S. Appl. No. 18/141,654 Published as: US2023/0269265, Systems and Methods for Cybersecurity Risk Mitigation and Management, filed filed May 1, 2023.
U.S. Appl. No. 16/802,232 U.S. Pat. No. 10,764,298, Systems and Methods for Improving a Security Profile of an Entity Based on Peer Security Profiles, filed Feb. 26, 2020.
U.S. Appl. No. 29/736,641 U.S. Pat. No. D. 937,870, Computer Display With Peer Analytics Graphical User Interface, filed Jun. 2, 2020.
U.S. Appl. No. 18/770,949 Published as: US2024/0362342, Systems and Methods for Assessing Cybersecurity Risk in a Work From Home Environment, filed Jul. 12, 2024.
U.S. Appl. No. 18/359,183 Published as: US2024/0045950, Systems and Methods for Assessing Cybersecurity Efficacy of Entities Against Common Control and Maturity Frameworks Using Externally-Observed Datasets, filed Jul. 26, 2023.
U.S. Appl. No. 17/856,217 Published as: US2023/0004655, Systems and Methods for Accelerating Cybersecurity Assessments, Jul. 1, 2022.
"Maltego 3 GUI user guide," 11 pages, Nov. 22, 2010 retrieved from Internet Archive Wayback Machine, https://web.archive.org/web/20101122112311/http://www.paterva.com:80/web5/documentation/Maltego3_crash_course.pdf on Aug. 30, 2024.
"User guide—Addendum to guide for Maltego 3.0.2," 20 pages, Nov. 23, 2010 retrieved from Internet Archive Wayback Machine, https://web.archive.org/web/20101123012539/http://www.paterva.com:80/web5/documentation/3.0.2.addendum.pdf on Aug. 30, 2024.
'834 Patent Claim Chart, *BitSight Technologies, Inc. v. NormShield Inc. d/b/a Black Kite Inc.,* Case No. 1:23-cv-12055-MJJ, D.I. 39-11 (Dec. 11, 2023), 28 pages.
"Maltego User Guide" webpage http://ctas.paterva.com/view/Userguide, 35 pages, Jun. 6, 2012, retrieved from Internet Archive Wayback Machine https://web.archive.org/web/20120606172056/http://ctas.paterva.com/view/Userguide on Sep. 6, 2024.
"MW Metadata", webpage https://mattw.io/youtube-metadata, 7 pages, retrieved on Aug. 21, 2024.
Anderson, H., "Nessus, Part 3: Analysing Reports," webpage http://www.securityfocus.com/infocus/1759, 5 pages, Oct. 20, 2006, retrieved from Internet Archive Wayback Machine https://web.archive.org/web/20061020202310/http://www.securityfocus.com/infocus/1759 on Aug. 16, 2024.
Aug. 29, 2024 Email from Melissa Nezhnik, 3 pages.
Curriculum Vitae of Kevin Almeroth Ph.D., 40 pages.
Declaration of Dr. Kevin Almeroth, 109 pages.
Declaration of Dr. Kevin Almeroth, 95 pages.
Declaration of Kevin Almeroth, Ph.D., 127 pages.
Declaration of Kevin Almeroth, Ph.D., 131 pages.
Declaration of Kevin C. Almeroth, PH.D. in support of Petition for Inter Partes Review of U.S. Pat. No. 11,777,976, 79 pages.
Declaration of Nathaniel Frank-White, 50 pages.
Declaration of Nathaniel Frank-White, 52 pages.
Declaration of Sylvia Hall-Ellis, Ph.D., 548 pages.
Gates, C., "New School Information Gathering," (2008), available at https://www.carnal0wnage.com/papers/17_Gates.pdf, 84 pages.
Gates, C., "Toorcon X Gates: New School Information Gathering," 2 pages, Mar. 2, 2009, retrieved from Internet Archive Wayback Machine https://web.archive.org/web/20090302045813/vimeo.com//2745624 on Aug. 13, 2024.
Gates, C., "Toorcon X Gates: New School Information Gathering," available at http://vimeo.com/2745624, 2 pages, retrieved on Aug. 13, 2024.
Keskin, O. F. et al., "Cyber Third-Party Risk Management: A Comparison of Non-Intrusive Risk Scoring Reports," Electronics, May 13, 2021);10(10): 1168, 19 pages.
Knowles, D. et al., "W32.Blaster. Worm: Technical Details" webpage http://www.symantec.com/security_response/writeup.jsp?docid=2003-081113-0229-99&tabid=2, 3 pages, May 3, 2007, retrieved from Internet Archive Wayback Machine https://web.archive.org/web/20070503023514/http://www.symantec.com/security_response/writeup.jsp?docid=2003-081113-0229-99&tabid=2 on Aug. 16, 2024.
Levy, E., "The Making of a Spam Zombie Army," IEEE Computer & Security (2003), pp. 58-59.
Long, J., "Google Hacking for Penetration Testers," 170 pages, Jan. 31, 2006, retrieved from Internet Archive Wayback Machine, https://web.archive.org/web/20060131095431/http://www.blackhat.com/presentations/bh-europe-05/BH_EU_05-Long.pdf on Aug. 30, 2024.
Martorella, C., "A fresh new look into Information Gathering," 68 pages, Dec. 29, 2009 retrieved from Internet Archive Wayback Machine, https://web.archive.org/web/20091229020339/http://www.edgesecurity.com/docs/OWASP-Christian_Martorella-InformationGathering.pdf on Aug. 30, 2024.
Matta Security Limited, "An Introduction to Internet Attack & Penetration," available at http:/www.trustmatta.com/downloads/pdf/, Matta_Attack_and_Penetration_Introduction.pdf, (2001-2002), 14 pages.
McNab, C., "Network Security Assessment," O'Reilly Media, Inc., Second Edition, (2008), 506 pages.
Moore & Valsmith, et al., "Tactical Exploitation," 37 pages, Feb. 8, 2010, retrieved from Internet Archive Wayback Machine https://web.archive.org/web/20100208161237/https://www.blackhat.com/presentations/bh-USA-07/Moore_and_Valsmith/Whitepaper/bh-USA-07-moore_and_valsmith-WP.pdf.
Nessus, "Documentation," webpage http://www.nessus.org/documentation/, 2 pages, Feb. 19, 2007, retrieved from Internet Archive Wayback Machine https://web.archive.org/web/20070219213924/http://www.nessus.org/documentation/ on Aug. 16, 2024.
Nessus, "Plugins: Symantec Anti Virus Corporate Edition Check," webpage http://www.nessus.org/plugins/index.php?view=single&id=21725, 2 pages, Feb. 22, 2007, retrieved from Internet Archive Wayback Machine https://web.archive.org/web/20070222133717/http://www.nessus.org/plugins/index.php?view=sing le&id=21725 on Aug. 13, 2024.
Nessus, "Plugins: The remote host is infected by a virus", webpage http://www.nessus.org/plugins/index.php?view=single&id=11329, 2 pages, Feb. 22, 2007, retrieved from Internet Archive Wayback Machine https://web.archive.org/web/20070222091638/http://www.nessus.org/plugins/index.php?view=single&id=11329 on Aug. 13, 2024.
Nessus, "Plugins: The remote host is infected by msblast.exe", webpage http://www.nessus.org/plugins/index.php?view=single&id=11818, 1 page, Sep. 24, 2006, retrieved from Internet Archive Wayback Machine https://web.archive.org/web/20060924205758/http://www.nessus.org/plugins/index.php?view=single&id=11818 on Aug. 13, 2024.
Prosecution History for U.S. Pat. No. 10,805,331, 1060 pages.
Prosecution History for U.S. Pat. No. 11,652,834, 344 pages.
Prosecution History for U.S. Pat. No. 11,777,976, 651 pages.
Prosecution History for U.S. Pat. No. 9,438,615, 232 pages.
Prosecution History for U.S. Pat. No. 9,973,524, 424 pages.
Representative Sample. Julie Young, Investopedia. Published Apr. 10, 2019 (Web Archive Aug. 19, 2019). Accessed on Aug. 19, 2024. [https://web.archive.org/web/20190819095403/https://www.investopedia.com/terms/r/representative-sample.asp].
Social-Engineer, LLC, "Social Engineering Using Maltego," webpage <www.youtube.com/watch?v=qiv4-wy3mxo>, 2 pages, Sep. 14, 2009, retrieved on Aug. 13, 2024.
Social-Engineer, LLC, Screen captures from "Social Engineering Using Maltego," webpage <www.youtube.com/watch?v=qiv4-wy3mxo>, 43 pages, Sep. 14, 2009.
Stoneburner, G. et al., "Risk Management Guide for Information Technology Systems," NIST, available at https://www.archives.gov/files/era/recompete/sp800-30.pdf, (Jul. 2002), 55 pages.
Tenable Network Security, Inc., "Nessus 3.0 Client Guide," available at http://nessus.org/documentation/nessus_3.0_client_guide.pdf, Mar. 6, 2007, 32 pages.
U.S. Appl. No. 15/271,655, Published as: US 2018/0083999, Self-Published Security Risk management, filed Sep. 21, 2016.
U.S. Appl. No. 15/377,574, U.S. Pat. No. 9,705,932, Methods and Systems for Creating, De-Duplicating and Accessing Data Using an Object Storage System, filed filed Dec. 13, 2016.

(56) References Cited

OTHER PUBLICATIONS

U.S. Appl. No. 14/021,585, U.S. Pat. No. 9,438,615, Published as: US2015/0074579, Security Risk Management, filed Sep. 9, 2013.
U.S. Appl. No. 15/216,955, U.S. Pat. No. 10,326,786, Published as: US 2016/0330231, Methods for Using Organizational Behavior for Risk Ratings, filed Jul. 22, 2016.
U.S. Appl. No. 15/239,063, U.S. Pat. No. 10,341,370, Published as US2017/0093901, Security Risk Management, filed Aug. 17, 2016.
U.S. Appl. No. 16/405,121, U.S. Pat. No. 10,785,245, Published as: US2019/0260791, Methods for Using Organizational Behavior for Risk Ratings, filed May 7, 2019.
U.S. Appl. No. 17/025,930, U.S. Pat. No. 11,652,834, Published as: US2021/0006581, Methods for Using Organizational Behavior for Risk Ratings, filed Sep. 18, 2020.
U.S. Appl. No. 18/297,863, Published as: US2023/0247041, Methods for Using Organizational Behavior for Risk Ratings, filed Apr. 10, 2023.
U.S. Appl. No. 13/240,572, U.S. Pat. No. 10,805,331, Published as: US2016/0205126, Information Technology Security Assessment System, filed Sep. 22, 2011.
U.S. Appl. No. 14/944,484, U.S. Pat. No. 9,973,524, Published as: US2016/0323308, Information Technology Security Assessment System, filed Nov. 18, 2015.
U.S. Appl. No. 17/069,151, U.S. Pat. No. 11,777,976, Published as: US2021/0211454, Information Technology Security Assessment System, filed Oct. 13, 2020.
U.S. Appl. No. 18/453,488, U.S. Pat. No. 12,010,137, Published as: US2023/0403295, Information Technology Security Assessment System, filed Aug. 22, 2023.
U.S. Appl. No. 18/461,087, U.S. Pat. No. 11,882,146, Published as: US202/0421600, Information Technology Security Assessment System, filed Sep. 5, 2023.
U.S. Appl. No. 15/142,677, U.S. Pat. No. 9,830,569, Published as: US2016/0239772, Security Assessment Using Service Provider Digital Asset Information, filed Apr. 29, 2016.
U.S. Appl. No. 15/134,845, U.S. Pat. No. 9,680,858, Annotation Platform for a Security Risk System, filed 21, 2016.
U.S. Appl. No. 15/044,952, U.S. Pat. No. 11,182,720, Published as: US2017/0236077, Relationships Amond Technology Assets and Services and the Entities Responsible for Them, filed Feb. 16, 2016.
U.S. Appl. No. 15/089,375, U.S. Pat. No. 10,176,445, Published as: US2017/0236079, Relationships Amond Technology Assets and Services and the Entities Responsible for Them, filed Apr. 1, 2016.
U.S. Appl. No. 29/598,298, D835,631, Computer Display Screen with Graphical User Interface, filed Mar. 24, 2017.
U.S. Appl. No. 29/598,299, D818,475, Computer Display with Security Ratings Graphical User Interface, filed Mar. 24, 2017.
U.S. Appl. No. 29/599,622, D847169, Computer Display with Security Ratings Graphical User Interface, filed Apr. 5, 2017.
U.S. Appl. No. 29/599,620, D846,562, Computer Display with Security Ratings Graphical User Interface, filed Apr. 5, 2017.
U.S. Appl. No. 16/015,686, U.S. Pat. No. 10,425,380, Published as: US2018/0375822, Methods for Mapping IP Addresses and Domains to Organizations Using User Activity Data, filed Jun. 22, 2018.
U.S. Appl. No. 16/543,075, U.S. Pat. No. 10,554,619, Published as: US, Published as: US2019/0379632, Methods for Mapping IP Addresses and Domains to Organizations Using User Activity Data, filed Aug. 16, 2019.
U.S. Appl. No. 16/738,825, U.S. Pat. No. 10,893,021, Published as: US2020/0153787, Methods for Mapping IP Addresses and Domains to Organizations Using User Activity Data, filed Jan. 9, 2020.
U.S. Appl. No. 17/146,064, U.S. Pat. No. 11,627,109, Published as: US2021/0218702, Methods for Mapping IP Addresses and Domains to Organizations Using User Activity Data, filed Jan. 11, 2021.
U.S. Appl. No. 15/918,286, U.S. Pat. No. 10,257,219, Correlated Risk in Cybersecurity, filed Mar. 12, 2018.
U.S. Appl. No. 16/292,956, U.S. Pat. No. 10,594,723, Published as: US2019/0297106, Correlated Risk in Cybersecurity, filed Mar. 5, 2019.
U.S. Appl. No. 16/795,056, U.S. Pat. No. 10,931,705, Published as: US2020/0195681, Correlated Risk in Cybersecurity, filed Feb. 19, 2020.
U.S. Appl. No. 17/179,630, U.S. Pat. No. 11,770,401, Published as: US2021/0176269, Correlated Risk in Cybersecurity, filed Feb. 19, 2021.
U.S. Appl. No. 18/365,384, Published as: US2023/0396644, Correlated Risk in Cybersecurity, filed Aug. 4, 2023.
U.S. Appl. No. 16/170,680, U.S. Pat. No. 10,521,583, Systems and Methods for Remote Detection of Software Through Browser Webinjects, filed Oct. 25, 2018.
U.S. Appl. No. 16/688,647, U.S. Pat. No. 10,776,483, Published as: US2020/0134174, Systems and Methods for Remote Detection of Software Through Browser Webinjects, filed Nov. 19, 2019.
U.S. Appl. No. 17/000,135, U.S. Pat. No. 11,126,723, Published as: US2021/0004457, Systems and Methods for Remote Detection of Software Through Browser Webinjects, filed Aug. 21, 2020.
U.S. Appl. No. 17/401,683, U.S. Pat. No. 11,727,114, Published as: US2021/0137243, Systems and Methods for Remote Detection of Software Through Browser Webinjects, filed Aug. 13, 2021.
U.S. Appl. No. 18/333,768, U.S. Pat. No. 12,099,605, Published as: US2023/0325502, Systems and Methods for Remote Detection of Software Through Browser Webinjects, filed Jun. 13, 2023.
U.S. Appl. No. 15/954,921, U.S. Pat. No. 10,812,520, Published as: US2019/0319979, Systems and Methods for External Detection of Misconfigured Systems, filed Apr. 17, 2018.
U.S. Appl. No. 17/014,495, U.S. Pat. No. 11,671,441, Published as: US2020/0404017, Systems and Methods for External Detection of Misconfigured Systems, filed Sep. 8, 2020.
U.S. Appl. No. 18/302,925, Published as: US2023/0269267, Systems and Methods for External Detection of Misconfigured Systems, filed Apr. 19, 2023.
U.S. Appl. No. 16/549,764, U.S. Pat. No. 11,956,265, Published as: US2021/0058421, Systems and Methods for Inferring Entity Relationships Via Network Communications of Users or User Devices, filed Aug. 23, 2019.
U.S. Appl. No. 16/787,650, U.S. Pat. No. 10,749,893, Systems and Methods for Inferring Entity Relationships Via Network Communications of Users or User Devices, filed Feb. 11, 2020.
U.S. Appl. No. 18/429,539, Published as: US2024/0179173, Systems and Methods for Inferring Entity Relationships Via Network Communications of Users or User Devices, filed Feb. 1, 2024.
U.S. Appl. No. 16/583,991, U.S. Pat. No. 10,848,382, Systems and Methods for Network Asset Discovery and Association Thereof With Entities, filed Sep. 26, 2019.
U.S. Appl. No. 17/085,550, U.S. Pat. No. 11,329,878, Published as: US2021/0099347, Systems and Methods for Network Asset Discovery and Association Thereof With Entities, filed Oct. 30, 2020.
U.S. Appl. No. 29/666,942, D892,135, Computer Display With Graphical User Interface, filed Oct. 17, 2018.
U.S. Appl. No. 16/360,641, U.S. Pat. No/ 11,200,323, Published as: US2020/0125734, Systems and Methods for Forecasting Cybersecurity Ratings Based on Event-Rate Scenarios, filed Mar. 21, 2019.
U.S. Appl. No. 17/523,166, U.S. Pat. No. 11,783,052, Published as: US2022/0121753, Systems and Methods for Foecasting Cybersecurity Ratings Based on Event-Rate Scenarios, filed Nov. 10, 2021.
U.S. Appl. No. 16/514,771, U.S. Pat. No. 10,726,136, Systems and Methods for Generating Security Improvement Plans for Entities, filed Jul. 17, 2019.
U.S. Appl. No. 16/922,673, U.S. Pat. No. 11,030,325, Systems and Methods for Generating Security Improvement Plans for Entities, filed Jul. 7, 2020.
U.S. Appl. No. 17/307,577, U.S. Pat. No. 11,675,912, Published as: US2021/0211454, Systems and Methods for Generating Security Improvement Plans for Entities, filed May 4, 2021.
U.S. Appl. No. 18/138,803, Published as: US2021/0267215, Systems and Methods for Generating Security Improvement Plans for Entities, filed Apr. 25, 2023.
U.S. Appl. No. 19/001,976, Systems and Methods for Generating Security Improvement Plans for Entities, filed Dec. 26, 2024.
U.S. Appl. No. 29/677,306, D905702, Computer Display Screen with Corporate Hierarchy Graphical User Interface, filed Jan. 18, 2019.

(56) References Cited

OTHER PUBLICATIONS

U.S. Appl. No. 16/775,840, U.S. Pat. No. 10,791,140, Systems and Methods for Assessing Cybersecurity State of Entities Based on Computer Network Characterization, filed Jan. 29, 2020.
U.S. Appl. No. 17/018,587, U.S. Pat. No. 11,050,779, Systems and Methods for Assessing Cybersecurity State of Entities Based on Computer Network Characterization, filed Sep. 11, 2020.
U.S. Appl. No. 16/779,437, U.S. Pat. No. 10,893,067, Published as: US2021/0243221, Systems and Methods for Rapidly Generating Security Ratings, filed Jan. 31, 2020.
U.S. Appl. No. 17/132,512, U.S. Pat. No. 11,595,427, Systems and Methods for Rapidly Generating Security Ratings, filed Dec. 23, 2020.
U.S. Appl. No. 18/158,594, U.S. Pat. No. 11,777,983, Systems and Methods for Rapidly Generating Security Ratings, filed Jan. 24, 2023.
U.S. Appl. No. 18/454,959, Published as: US2024/129332, Systems and Methods for Rapidly Generating Security Ratings, filed Aug. 24, 2023.
U.S. Appl. No. 17/119,822, U.S. Pat. No. 11,122,073, Systems and Methods for Cybersecurity Risk Mitigation and Management, filed Aug. 24, 2023.
U.S. Appl. No. 29/815,855, D1010666, Computer Display with a Graphical User Interface for Cybersecurity Risk Management, filed Nov. 17, 2021.
U.S. Appl. No. 17/392,521, U.S. Pat. No. 11,689,555, Published as US 2022/0191232, Systems and Methods for Cybersecurity Risk Mitigation and Management, filed Aug. 3, 2021.
U.S. Appl. No. 18/141,654, Published as: US2023/0269265, Systems and Methods for Cybersecurity Risk Mitigation and Management, filed My 1, 2023.
U.S. Appl. No. 18/962,320, Systems and Methods for Cybersecurity Risk Mitigation and Management, filed Nov. 27, 2024.
U.S. Appl. No. 29/916,503, Computer Display with a Graphical User Interface, filed Nov. 13, 2023.
U.S. Appl. No. 29/916,519, Computer Display with a Graphical User Interface, filed Nov. 13, 2023.
U.S. Appl. No. 16/802,232, Systems and Methods for Improving a Security Profile of an Entity Based on Peer Security Profiles, filed Feb. 26, 2020.
U.S. Appl. No. 16/942,452, U.S. Pat. No. 11,265,330, Published as: US2021/0266324, Systems and Methods for Improving a Security Profile of an Entity Based On Peer Security Profiles, filed Jul. 29, 2020.
U.S. Appl. No. 29/725,724, Computer Display With Risk Vectors Graphical User Interface, filed Feb. 26, 2020.
U.S. Appl. No. 29/736,641, D937870, Computer Display With Peer Analytics Graphical User Interface, filed Jun. 2, 2020.
U.S. Appl. No. 17/039,675, U.S. Pat. No. 11,032,244, Published as: US2021/0099428, Systems and Methods for Determining Asset Importance in Security Risk Management, filed Sep. 30, 2020.
U.S. Appl. No. 17/320,997, U.S. Pat. No. 11,949,655, Published as US 2021/0344647, Systems and Methods for Determining Asset Importance in Security Risk Management, filed May 14, 2021.
U.S. Appl. No. 18/422,470, Published as: US2024/0163252, Systems and Methods for Determining Asset Importance in Security Risk Management, filed Jan. 25, 2024.
U.S. Appl. No. 16/884,607, U.S. Pat. No. 11,023,585, Systems and Methods for Managing Cybersecurity Alerts, filed May 27, 2020.
U.S. Appl. No. 17/236,594, U.S. Pat. No. 11,720,679, Published as: US2021/0374246, Systems and Methods for Managing Cybersecurity Alerts, filed Apr. 21, 2021.
U.S. Appl. No. 18/335,384, U.S. Pat. No. 12,099,608, Published as: US2023/0325505, Systems and Methods for Managing Cybersecurity Alerts, filed Jun. 15, 2023.
U.S. Appl. No. 17/710,168, Published as: US2022/0318400, Systems and Methods for Assessing Cybersecurity Risk in a Work From Home Environment, filed Mar. 31, 2022.
U.S. Appl. No. 18/770,949, Published as: US2024/0362342, Systems and Methods for Assessing Cybersecurity Risk in a Work From Home Environment, filed 12, 2024.
U.S. Appl. No. 18/359,183, Published as: US2024/0045950, Systems and Methods for Assessing Cybersecurity Efficacy of Entities Against Common Control and Maturity Frameworks Using Externally-Observed Datasets, filed 26, 2023.
U.S. Appl. No. 17/856,217, Published as: US2023/0004655, Systems and Methods for Accelerating Cybersecurity Assessments, filed 2022.
U.S. Appl. No. 19/211,601, Systems and Methods for Accelerating Cybersecurity Assessments, filed May 19, 2025.
U.S. Appl. No. 18/162,154, Published as: US2023/0244794, Systems and Methods for Assessment of Cyber Resilience, filed Jan. 31, 2023.
U.S. Appl. No. 18/328,142, Systems and Methods for Modeling Cybersecurity Breach Costs, filed Jun. 2, 2023.
U.S. Appl. No. 18/678,378, Systems and Methods for Predicting Cybersecurity Risk Based on Entity Firmographics, filed May 30, 2024.
Mockapetris, P., RFC 1035—Domain Name—Implementation and Specification, 55 pages (1987).

\* cited by examiner

SYSTEMS AND METHODS FOR PRECOMPUTATION OF DIGITAL ASSET INVENTORIES

CROSS-REFERENCE TO RELATED APPLICATION(S)

This application claims priority to and the benefit of U.S. Provisional Patent Application Ser. No. 63/245,427, entitled "Systems and Methods for Precomputation of Digital Asset Inventories" filed on Sep. 17, 2021, the entire disclosure of which is incorporated by reference herein.

TECHNICAL FIELD

The following disclosure is directed to methods and systems for assessing digital footprints of entities, and, more specifically, methods and systems for efficiently precomputing a comprehensive set of digital assets associated with an entity.

BACKGROUND

Performing accurate and timely assessments of an organization's cybersecurity risk profile and security performance requires access to a digital asset inventory for the organization. The development of such an inventory traditionally requires a query of a known associated asset, such as primary domain name, against Internet registry data sources and recursively pivoting upon newly discovered assets in query results to expand the inventory. For large organizations, this recursive process can be too slow to facilitate real-time requests since each recursive round of queries are dependent upon the completion of the prior round. Likewise, such an approach can make it difficult to include additional data sources or methods considering it further lengthens the time to discover assets across all methods for a single organization.

SUMMARY

Efficiently and accurately building a comprehensive digital asset inventory for an organization by modeling the digital asset relationships as a graph structure and computing the resulting graph features provides significant advantages over conventional approaches. For example, by indexing domains, IP addresses and other source-identifiable digital assets with their various component features prior to executing queries against the asset inventory, the entire related community of digital assets can be retrieved for a given organization of interest with a single query, bypassing the traditional high-latency, recursive query process and enabling low-latency use cases of digital asset inventories. Further, a graphical representation of digital asset data enables additional capabilities such as the ability to corroborate relationships between identifiers that may not be robust in isolation, and the ability to conduct production-scale testing on newly developed methods of processing relationships into digital asset attributions.

In one aspect, the invention comprises a computer-implemented method of discovering and attributing computational assets to respective entities. The method comprises receiving a plurality of datasets, each dataset comprising source control data that represents an observation of a grouping of related data (e.g., domain registry information, website data, certificate data) for a plurality of entities, which in turn comprises a plurality of attributes, including in some instances point of contact data elements. A blocklist filter is applied to filter the source control data, and a human analysis step curates the normalized data, thereby removing or revising one or more records in the source control data. The filtered and curated dataset is stored in a persistent data storage device as a bipartite graph, where a first set of nodes of the bipartite graph represents sources identified in the source control data and a second set of nodes represents attributes related to the source control data and edges connecting nodes in the first set and second set represent source control data and attributes associated with a common entity. The dataset can be queried to identify attributes of the source control data associated with a common entity based on a common associated attributes.

In some instances, the point of contact data elements comprise one or more of phone number and an email address, which may be further associated with an individual. In some embodiments, the point of contact data elements are normalized such that the normalized data elements maintain a consistent format across the source control data. The application of the blocklist filter may, in some cases, identify, remove, and/or associate a reason code with source control data that are either (i) redundant or (ii) refer to a bulk control entity, which in some cases may control domains on behalf of another entity. In some embodiments, domain registrations appearing more frequently than a certain threshold may be removed. In certain instances, the relationships between the source control data and the attributes related to the source control data with a datestamp value representing the date the relationship was first identified.

Other aspects of the invention comprise systems implemented in various combinations of computing hardware and software to achieve the methods described herein.

DETAILED DESCRIPTION

Figure 1:
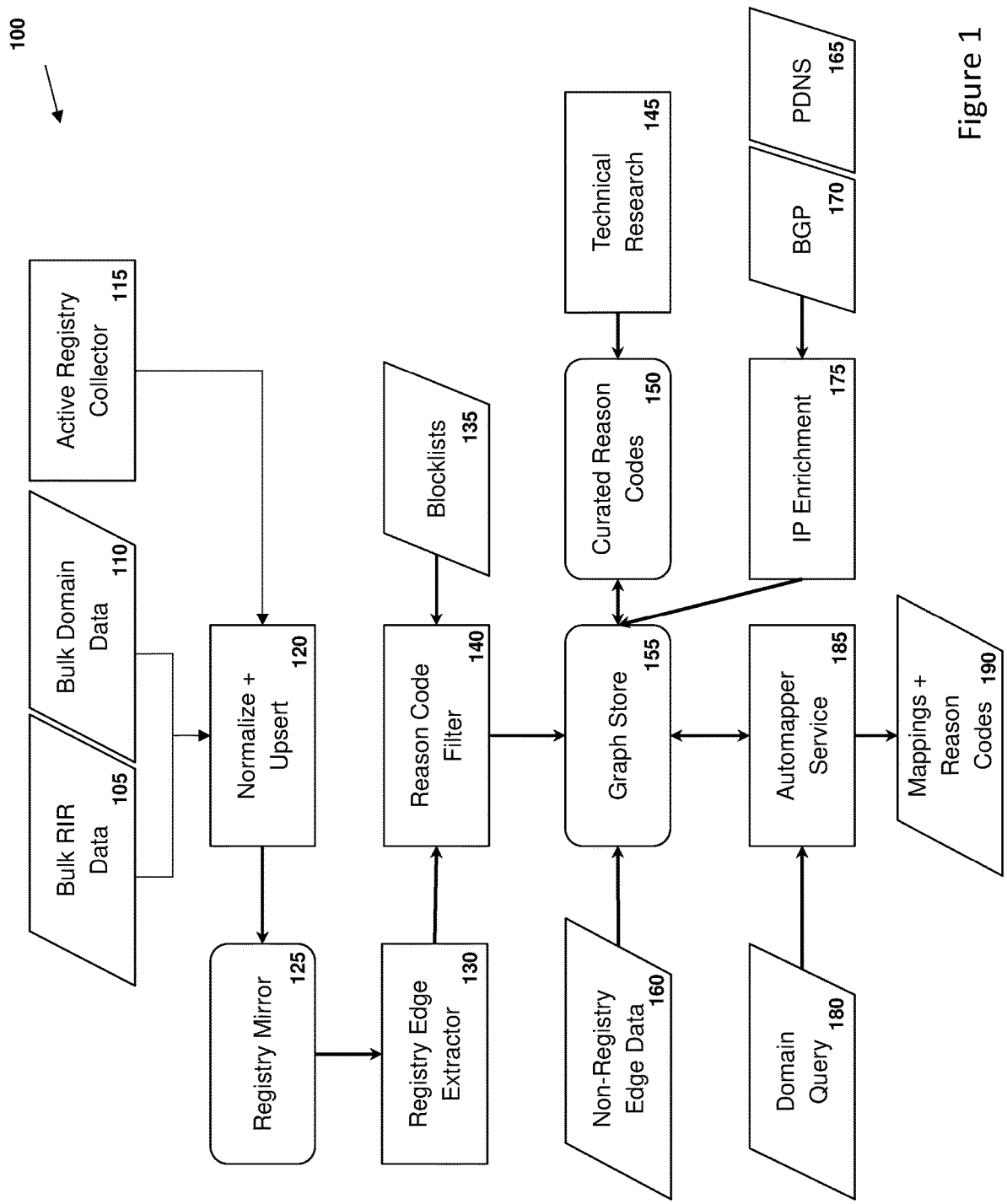
FIG. 1 is a block diagram of an asset inventory system, according to some embodiments.

The present disclosure is directed to methods and systems for compiling and curating a real-time asset inventory by precomputing all possible digital asset inventories associated with a set of entities. This is accomplished through modeling digital asset relationships as graph data structure and computing structural features of the graph such as connected components, modularity, and breadth-first searches. Such an inventory can be used, for example, to assess the cybersecurity rating or state of an entity.

Examples of determining and/or evaluating the security characteristics of entities and associated IP addresses, and determining security ratings and risk vector ratings/grades of entities based on the security characteristics can be found in at least U.S. Publication No. 2016/0205126 published on Jul. 14, 2016 and titled "Information Technology Security Assessment System," U.S. Pat. No. 9,973,524 issued on May 15, 2018 and titled "Information Technology Security Assessment System," U.S. Pat. No. 9,830,569 issued on Nov. 28, 2017 and titled "Security Assessment Using Service Provider Digital Asset Information," and U.S. patent application Ser. No. 16/514,771 filed on Jul. 17, 2019 and titled "Systems and methods for generating security improvement plans for entities", U.S. Pat. No. 10,893,021 issued on Jan. 12, 2021 and titled "Methods of Mapping IP Addresses and Domains to Organizations Using User Activity Data, U.S. Pat. No. 10,425,380, issued on Sep. 24, 2019 and titled "Methods for Mapping IP Addresses and Domains to Organizations Using User Activity Data, U.S. Pat. No. 10,848,382 issued on Nov. 24, 2020 and titled "Systems and Methods for Network Asset Discovery and Association Thereof with Entities", and U.S. Pat. No. 11,050,779, issued on Jun. 29, 2021 and titled "Systems and Methods for Assessing Cybersecurity State of Entities Based on Computer Network Characterization", all of which are incorporated herein by reference in their entireties.

In certain embodiments, source record datasets that describe associations between one or more organizational assets, or one or more organizational assets and other organizational identifiers (e.g. organization name, address, phone number, customer identifier, email address, etc.) are ingested and used as a basis for the compilation process. One example of such a source record dataset is the Internet registry data (such as that provided by Regional Internet Registries and domain registrars). Some registry databases contain an intrinsic graph structure with records for IP address ranges or domain names pointing to foreign keys that represent other records. As an example, a fictional American Registry for Internet Numbers (ARIN) record that represents "Example Corp" may point to a "point of contact" record with contact details and a network record with CIDR information. By extracting such relationships to form a graphical representation of associations between various forms of identifiers (IP address ranges, domain names) and various attributes of their organizational association, such as their point of contact information (email addresses, physical addresses, phone numbers, etc.), registration information (unique privacy emails, embedded customer identifiers, etc.), or other unique customer identifiers (challenge hash, API key, CNAME records, etc.), graph algorithms can be applied to preprocess the graph across a diverse set of data inputs into suitable components to enable low-latency retrieval of related identifiers at a later date.

FIG. 1 illustrates one exemplary architecture and data flow of a system 100 for processing and modeling such data records. Initially, source record data such as bulk registry 105 and domain data 110 is collected, normalized and aggregated. These datasets can include data extracted from web page source code, website traffic logs, TLS certificates, and DNS datasets. Internet registries 115, as well as other datasets that include user-contributed information, often allow for the free-form entry of point of contact information which means that a specific identifier may be formatted in a variety of ways. In order to increase the efficacy of resolving various formats of the same identifier, a normalization process 120 may be applied. An example of such normalization may include converting a phone number to an E.164 format, for example, whereas another example may include standardizing the formatting of physical addresses.

A registry mirror 125 stores the data locally to allow for local processing. When using Internet registry mirror data, the method runs graph algorithms on all relationships; and as a result, all available such data can be mirrored in local storage. In some cases, a raw representation of registry records is maintained in order to maintain provenance on relationships derived from the records. The system can also ingest bulk registry records and execute an ad-hoc active collection process to retrieve specific records from various Internet registries on demand. The on-demand system is then used to refresh stale bulk records or fill in record gaps missed in the bulk collection process. Accessibility to bulk data, where the system has a readily efficient means of enumerating all information contained therein, is also required of any other ingested dataset for this system. Those datasets may also be collected using any combination of methods at disparate times, for example as either a passive and active source, or pushed or pulled from different third-party providers. An edge extraction process 130 identifies and extracts the relationships among assets and stores the representative data for subsequent graphing, as described in greater detail below.

In some cases, a blocklist of domains, organizations or other identifiers is maintained and used to filter out edges that may be redundant or known to be inaccurate or appear in some number of records over a certain threshold. For example, in some datasets, the attributing information of an identifier may be associated with an organization that does not control that identifier in practice. More specifically, when ingesting Internet registry data the system may start with an initial assumption that the point of contact information for a given registration belongs to the organization that owns or operates the identifier present in the registration. This point of contact information may include, for example, a phone number, an email address, or some other identifier associated with an individual or an entity. However, this is not always the case as occasionally IT or telecommunications service providers appear as registration points of contact on behalf of their customers. As such, it is necessary to exclude relationships between identifiers and service provider attributes to prevent assets belonging to a service provider from being attributed to their customers (or vice-versa). In one method, a large, curated blocklist 135 of domain names or other attributes known to belong to service providers is maintained. If a point of contact record uses a domain name in the blocklist or any other attribute known to belong to service providers such as an organization name, the relations from the point of contact are not used resolving relationships. In another approach, heuristics of degree counts in the graph may be used to identify records that should be included in the blocklist. Service provider points of contacts are typically used on behalf of a very large customer base (higher than an individual end-user contact would), so in the graphical representation, they manifest as nodes with a very high degree. Nodes with high degree can be submitted for scrutiny for inclusion in the service provider blocklist. In some cases, a reason code may be associated with the filtered record 140 to notate the reason for its removal from the primary dataset. In some cases, an additional human curation step can be implemented into the otherwise automated process.

Once the dataset is deemed to be ready for further processing, the data is formatted into a structure that facilitates low-latency retrieval of related identifiers and stored for subsequent use. Additional technical data and research 145 can be done offline, in parallel, or asynchronously, augmented with additional codes 150 to identify sources, reasons for inclusion, etc. and added to the graph store 155. Other non-registry data 160 can also be added to the graph store 155 to further augment the data. In some cases, data that has a tendency to evolve or change over time such as associations between IP addresses and domain names obtained 165 through the Domain Name Resolution (DNS) system, or IP address ranges and Autonomous System Numbers (ASN) observed in Border Gateway Protocol (BGP) advertisements 170, can be added 175 to the graph store 155 to further enhance the accuracy and completeness of the data. To further accelerate the querying process 180, an automapping service 185 may be added to the process to precompute a set of relationships for certain entities 190.

Figure 2:
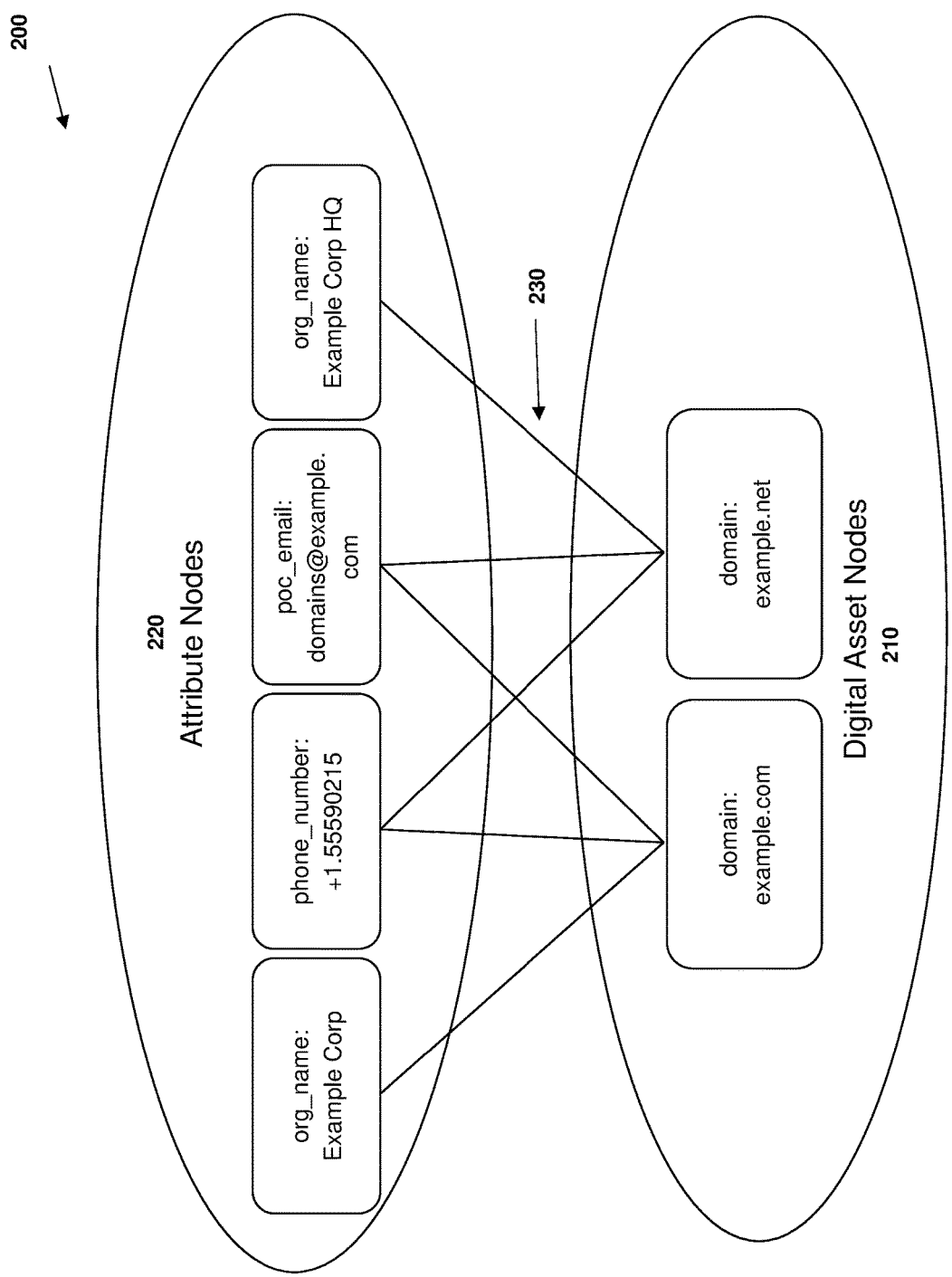
FIG. 2 depicts a mapping of entity attributes to digital asset nodes, according to some embodiments.

FIG. 2 provides a more detailed representation of a mapping of a bipartite graph 200 with one set of nodes representing digital assets 210 and the second set of nodes representing artifacts or attributes 220 of that asset which could potentially be shared with other digital assets based on the extracted data shown below:

example.com -(org_name)→Example Corp
example.com -(address)→100 Example Street, New York, NY 10282 US
example.com -(phone)→+1.5555590215
example.com -(poc_email)→domains@example.com
example.com -(poc_domain)→example.com
example.net -(org_name)→Example Corp HQ
example.net -(address)→100 Example Street, New York, NY 10282 US
example.net -(phone)→+1.5555590215
example.net -(poc_email)→domains@example.com
example.net -(poc_domain)→example.com In this example, the extracted edges 230 illustrated in FIG. 2 may represent a relationship between a domain name or an IP address range, and an attribute of Point of Contact (PoC) information. Such PoC attributes and others within registry information may include email addresses, domain names, organization names, customer identifiers, postal addresses, phone numbers, or even individual's names. In many instances, Internet registries, website data, certificate registries, as well as other datasets that include user-contributed information, often allow for the free-form entry of PoC information, which results in a specific identifier having a non-standard format. In order to increase the efficacy of resolving various formats of the same identifier, the normalization process 125 can be applied—such as converting a phone number to an E.164 format when possible, or standardizing the formatting of physical addresses.

In addition to Internet registries, the inclusion of additional data sources that suggest relationships between various identifiers can improve the efficacy of the attribution system. Notable sources include sources that provide associations between:

A website domain and a unique identifier present on the website (e.g. Google Analytics tracking code);
A website domain and another website domain to which it redirects visiting clients;
A domain name and the DNS nameserver it is configured to use;
A domain name, and another matching domain name served under a different top-level domain (e.g., example.com and example.net);
A domain name present in a TLS certificate and the other domains present in the same certificate; and
An IP address observed associated with a web cookie (or other identifier) and other IP addresses observed using the same identifier.

In some datasets, the attributing information of an identifier may be associated with an organization that does not control that identifier in practice. For example, when ingesting Internet registry data the system may rely on an assumption that the point of contact information for a given registration belongs to the organization that owns or operates the identifier present in the registration. However, this is not always the case as occasionally IT or telecommunications service providers appear as registration points of contact on behalf of their customers. As such, in some instances it may be beneficial to exclude relationships between identifiers and service provider attributes to prevent assets belonging to a service provider from being attributed to their customers (or vice-versa).

In one example, the system may compile and maintain a curated blocklist of domain names or other attributes known (or likely) to belong to service providers. If a point of contact record uses a domain name in the blocklist, or any other attribute known to belong to service providers such as an organization name, the relations from the point of contact are not used for resolving relationships.

Another example uses heuristics of degree counts in the graph to identify records to be included in the blocklist. Service provider points of contacts are typically used on behalf of a very large customer base (higher than an individual end-user contact would), and as a result in the graphical representation, they manifest as nodes with a very high degree. Nodes with high degree or that appear in frequency above a certain threshold can be submitted for scrutiny for inclusion in the service provider blocklist and potentially filtered out.

In some cases, relationships that may be crucial for improving the quality of asset maps may not be readability identified through automated processes, and may rely on a manual curation process. This can be achieved, for example, through the incorporation of a set of human curated edges in the graph to capture relationships identified through human analysis. By combining the curated relationships with those derived through automated processing of registry data and other sources, associations between identifiers can be made that would be missed through automated means alone.

Once a filtered list of edges representing relationships has been extracted to form a graph, the data representing the edges is reorganized into a format that enables low-latency retrieval of a set of related identifiers. The goal of this step is to partition the graph into groups of relationships such that a single organization owns every identifier in a given group. Two particular graph techniques facilitate such partitioning.

A first approach analyzes the connected components and the strength of the connections. A subgraph for which a path exists between every set of pairwise nodes in the component can be referred to as a "weakly connected component" whereas "separate components" are components where no path will exist between pairwise nodes. Connected components are calculated by conducting a breadth/depth first search from every unvisited node in a graph. If the graph is composed only of relationships between digital assets and attributes of the owners of those assets, each component will contain a subgraph of relationships belonging to a specific organization. Each subgraph is then indexed by each identifier present within it, enabling fast retrieval of all identifiers in the component when any constituent identifier is queried.

Figure 3:
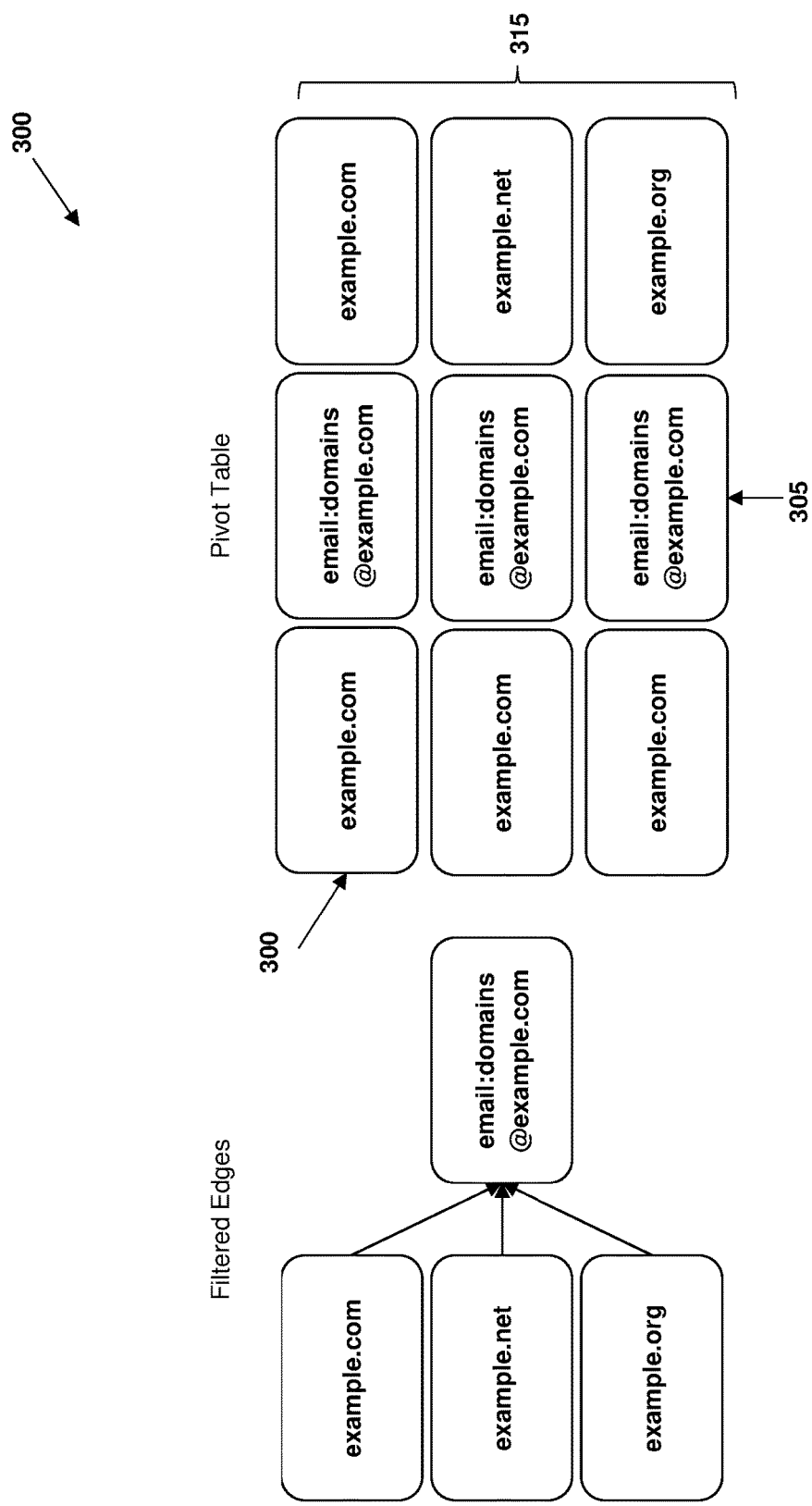
FIG. 3 depicts a mapping of graph edges to a tabular representation of digital assets, according to some embodiments.

A second technique, referred to as "attribute projection" is illustrated in FIG. 3. In this method, a one-mode projection is computed about the attribute nodes of the graph to produce a table of domain associations linked by a common identifier 305. Each row is indexed by the first identifier in the pivot table 310, enabling fast retrieval of all related identifiers 315 along with the attribute 305 that was used to associate them together with the queried domain. This projection method may associate fewer identifiers to a given queried domain; however, it greatly reduces the potential false positive impact of service provider associations that are not present in the blocklist. Depending on the results produced by each method, it may be desirable to use one or the other. For instance, if the connected component method produces more results than would be expected for an organization given its size, the pivot method can be used instead with the assumption that the connected component method may be tainted by a service provider relationship.

Figure 4:
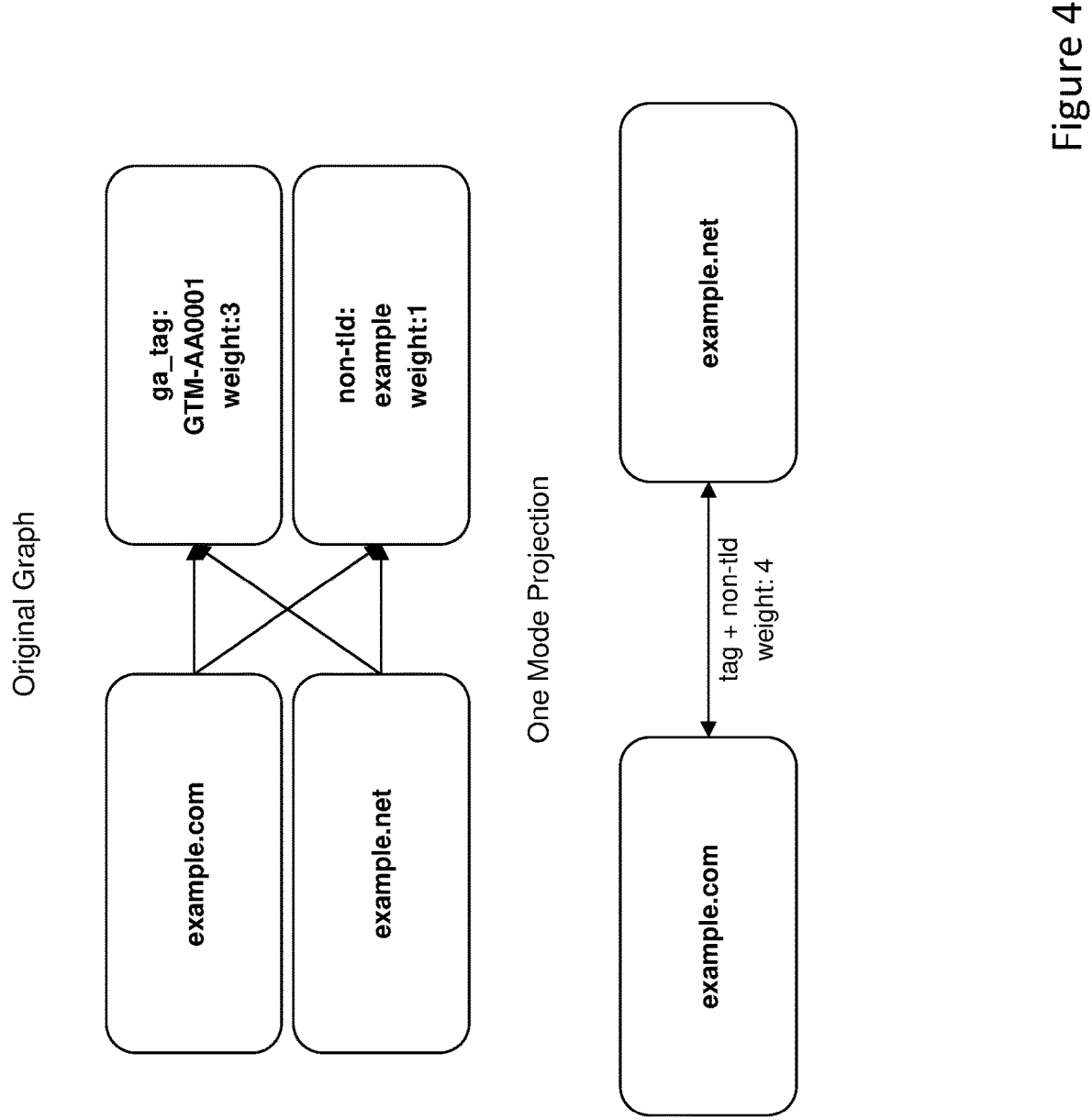
FIG. 4 depicts a single projection mapping of digital assets, according to some embodiments.

The graph component processing relies generally on relationships that are reliably attributable to a specific organization; however, in many cases there may be relationships that are not reliable in isolation but very reliable when they are corroborated with other associations. This also applies to the aforementioned domain and IP registry information, considering there may exist records that are stale and not actually used in practice by the cited organization, due to reasons, for example, that the ISP failed to remove that record from the registry once the company ended the contract with that ISP. One example of another dataset demonstrating identifier use is the association of a website domain and a specific web analytics identifier such as a Google Analytics tag. While it is common for a Google Analytics tag to be unique to an organization, they can also be used across multiple customer websites of a third-party marketing firm. In this instance, the shared usage of a specific Google Analytics tag does not imply shared ownership of the website domain. Another example is that while it is very likely that "example.com" and "example.net" are operated by the same organization, it is certainly not guaranteed. However, if "example.com" and "example.net" also shared a common Google Analytics tag, it is very likely that they are owned by the same organization as these separate associations independently corroborate one another. The graph representation can be used to discover such corroborating relationships, and incorporated into the mapping process by deriving new "meta" edges of robust, corroborated associations. An example of such corroboration is illustrated in FIG. 4.

In some instances, Corroborations can be discovered by computing a one-mode projection about the attribute nodes, generating a new graph in which an edge exists between any two asset nodes that share a common attribute. When more than one edge exists between two digital asset nodes, it has multiple corroborating associations. A scoring or weight function applied to the edges can be used to filter the projected graph to only those corroborations deemed of sufficient reliability. In some cases, any discovered corroboration may be considered valid, whereas in other, more complex schemes, weights are assigned to different attribute nodes and only those corroborations exceeding a weight threshold are considered valid. The notion of weight application can be applied onto all edges of all data sets, including registry information. The weight may vary based on how the dataset was collected, which can be helpful when the dataset originates from multiple sources. In some cases, it may be desirable to have provenance over relationships in the graph so they are defensible when scrutinized. This can be achieved by, for example, by maintaining a reference from the source document (such as registry record in the registry mirror) the relationship was extracted such that it can be later referenced.

Figure 5:
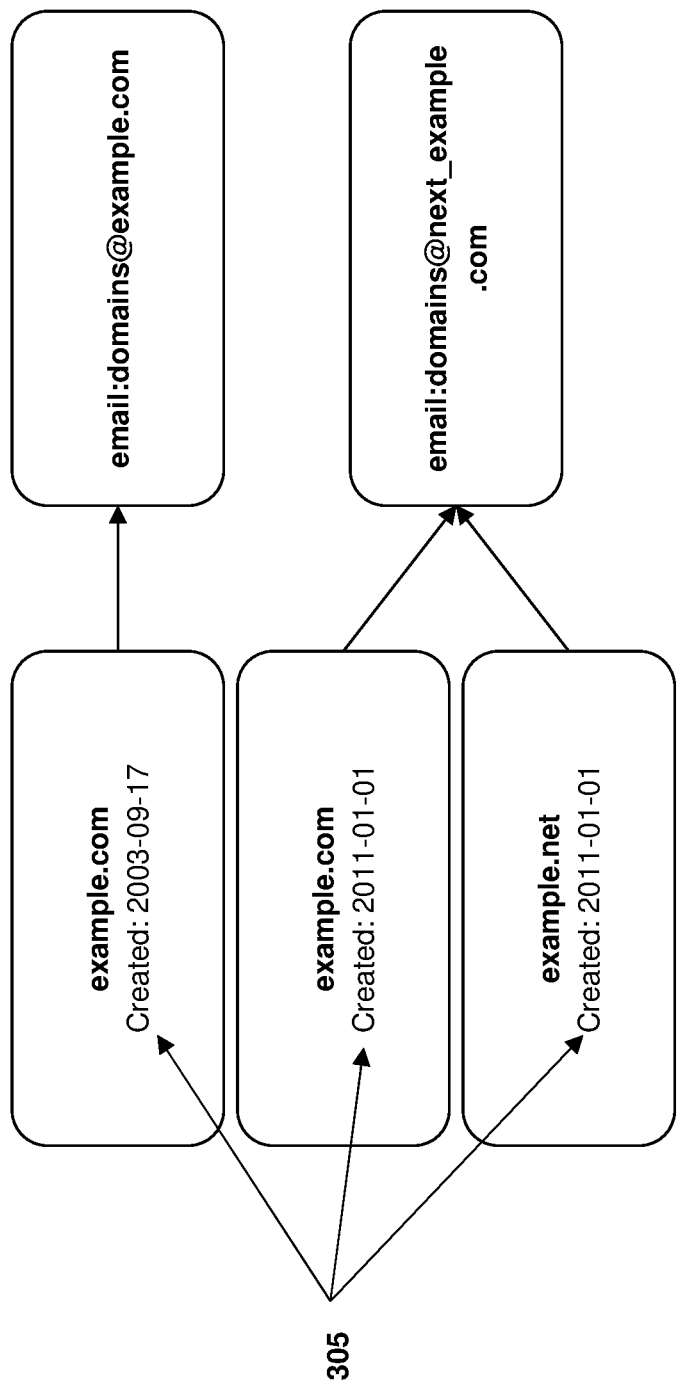
FIG. 5 depicts an example of a digital asset mapping that considers the temporal aspects of the assets, according to some embodiments.

Registry records and other datasets may not be updated frequently, but nevertheless they do change over time. As such, it may be beneficial to capture a temporal element of the data such that it is possible to attribute relationships to only the given window of time in which they are valid. This can be captured by including notions of start and end dates for relationships in the graph, either as attributes of the nodes in the graph, as attributes of the edges, or both. When a registry record or other record is updated such that the relationship that was previously present in the record is no longer valid, the relationship is end dated and a new relationship is created with the new start date. In FIG. 5, an example is illustrated having a "created" date 505 such that when the system attempts to map domain "example.com", "example.net" would only be attributed to it starting at 2011-01-01 at which time the domains@next_example.com relationship supersedes the previous relationship for the same domain.

In some examples, some or all of the processing described above can be carried out on a personal computing device, on one or more centralized computing devices, or via cloud-based processing by one or more servers. In some examples, some types of processing occur on one device and other types of processing occur on another device. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

Figure 6:
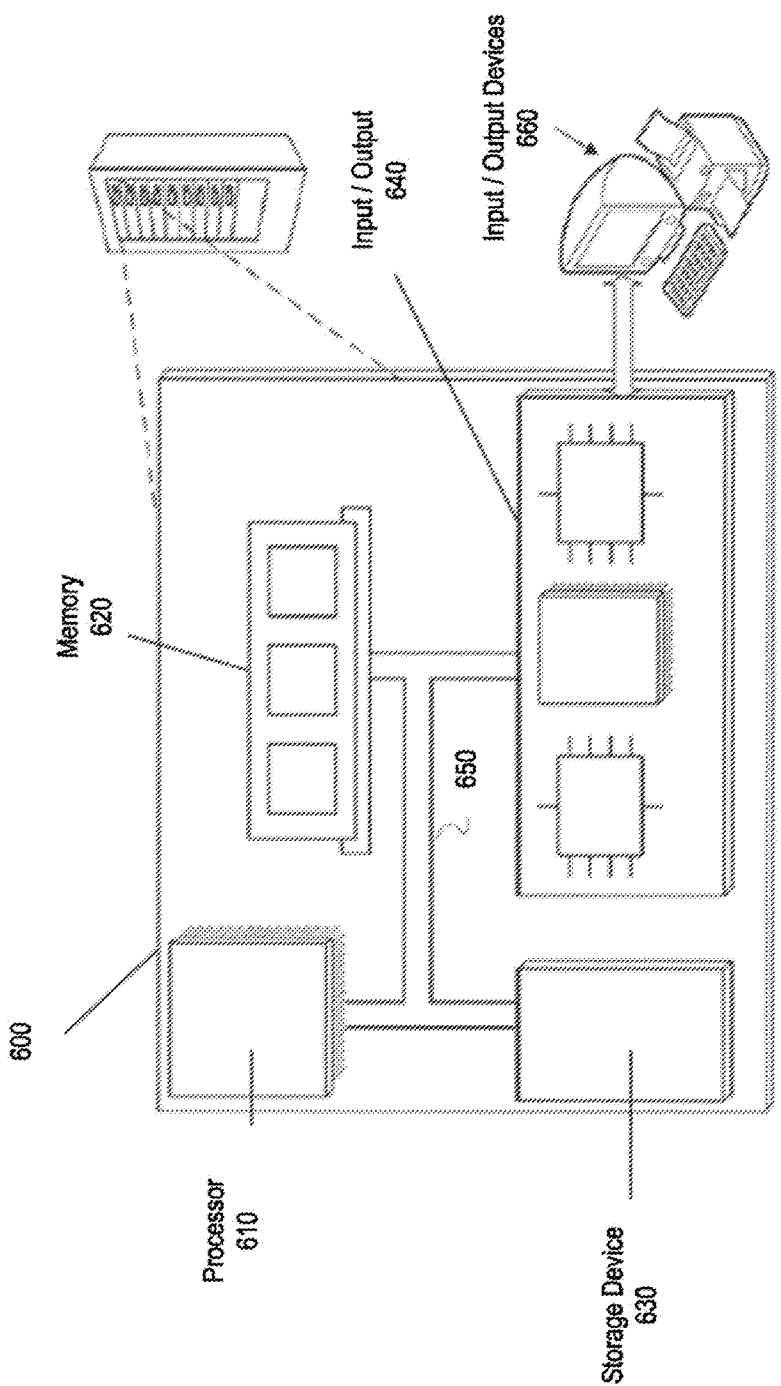
FIG. 6 is a block diagram of an example computer system that may be used in implementing the technology described herein.

FIG. 6 is a block diagram of an example computer system 600 that may be used in implementing the technology described in this document. General-purpose computers, network appliances, mobile devices, or other electronic systems may also include at least portions of the system 600. The system 600 includes a processor 610, a memory 620, a storage device 630, and an input/output device 640. Each of the components 610, 620, 630, and 640 may be interconnected, for example, using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630.

The memory 620 stores information within the system 600. In some implementations, the memory 620 is a non-transitory computer-readable medium. In some implementations, the memory 620 is a volatile memory unit. In some implementations, the memory 620 is a nonvolatile memory unit.

The storage device 630 is capable of providing mass storage for the system 600. In some implementations, the storage device 630 is a non-transitory computer-readable medium. In various different implementations, the storage device 630 may include, for example, a hard disk device, an optical disk device, a solid-date drive, a flash drive, or some other large capacity storage device. For example, the storage device may store long-term data (e.g., database data, file system data, etc.). The input/output device 640 provides input/output operations for the system 600. In some implementations, the input/output device 640 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 660. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 630 may be implemented in a distributed way over a network, such as a server farm or a set of widely distributed servers, or may be implemented in a single computing device.

Although an example processing system has been described in FIG. 6, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

What is claimed is:

1. A computer-implemented method of discovering and attributing computational assets to respective entities, the method comprising:
   receiving a dataset comprising source record data for a plurality of entities, the source record data comprising a plurality of source records and a plurality of attributes associated with the source records;
   applying a blocklist filter of domains against the source record data to identify and remove a first subset of the source record data that refers to a bulk control entity;
   performing a human curation step against the source record data to curate the source record data, thereby removing or revising one or more of the source records in the source record data;
   storing the curated and filtered dataset in a persistent data storage device as a bipartite graph, wherein a first set of nodes of the bipartite graph represents the source records, a second set of nodes represents the attributes associated with the source records, and edges connecting nodes in the first set and second set represent source records and attributes associated with a common entity; and
   querying the stored dataset to identify the attributes of the source record data associated with the common entity based on a common associated source record of the source records.

2. The method of claim 1, wherein the source record data comprises data collected from one or more of registry datasets, website data, certificate registries, and DNS datasets.

3. The method of claim 1, wherein the attributes associated with the source records comprise point of contact data elements.

4. The method of claim 3, wherein the point of contact data elements comprise one or more of a phone number and an email address.

5. The method of claim 4, wherein at least a subset of the point of contact data elements are further associated with an individual.

6. The method of claim 1, further comprising normalizing one or more of the attributes associated with the source records such that the normalized attributes maintain a consistent format across the source record data.

7. The method of claim 1, wherein the application of the blocklist filter identifies and removes a second subset of the source record data that is redundant.

8. The method of claim 1, wherein the bulk control entity controls domain registrations on behalf of another entity.

9. The method of claim 7, wherein the source record data further comprises domain registrations, and further comprising identifying and removing a subset of the domain registrations from the source record data that appear at a frequency above a threshold.

10. The method of claim 9, further comprising associating a reason code with such identified domain registrations.

11. The method of claim 1, further comprising augmenting a relationship between the source records and the attributes associated with the source records with a datestamp value representing a date the relationship was first identified.

12. A system for discovering and attributing computational assets to respective entities, the system comprising:
   one or more computer systems each comprising one or more processors and a memory, the one or more computer systems being programmed to perform operations comprising:
      receiving a dataset comprising source record data for a plurality of entities, the source record data comprising a plurality of source records and a plurality of attributes associated with the source records;
      applying a blocklist filter of domains against the source record data to identify and remove a first subset of the source record data that refers to a bulk control entity;
      performing a human curation step against the source record data to curate the source record data, thereby removing or revising one or more of the source records in the source record data;

storing the curated and filtered dataset in a persistent data storage device as a bipartite graph, wherein a first set of nodes of the bipartite graph represents the source records, a second set of nodes represents the attributes associated with the source records, and edges connecting nodes in the first set and second set represent source records and attributes associated with a common entity; and querying the stored dataset to identify the attributes of the source record data associated with the common entity based on a common associated source record of the source records.

13. The system of claim 12, wherein the source record data comprises data collected from one or more of registry datasets, website data, certificate registries and DNS datasets.

14. The system of claim 12, wherein the attributes associated with the source record data comprise point of contact data elements.

15. The system of claim 14, wherein the point of contact data elements comprise one or more of phone numbers and email addresses.

16. The system of claim 13, wherein at least a subset of the point of contact data elements are further associated with an individual.

17. The system of claim 12, wherein the one or more computer systems are further programmed to perform operations comprising normalizing one or more of the attributes associated with the source records such that the normalized attributes maintain a consistent format across the source record data.

18. The system of claim 12, wherein the application of the blocklist filter identifies and removes a second subset of the source record data that is redundant.

19. The system of claim 18, wherein the bulk control entity controls domain registrations on behalf of another entity.

20. The system of claim 18, wherein the source record data further comprises domain registrations, and wherein the one or more computer systems are further programmed to perform operations comprising identifying and removing a subset of the domain registrations from the source record data that appear at a frequency above a threshold.

21. The system of claim 18, wherein the one or more computer systems are further programmed to perform operations comprising associating a reason code with such identified domain registrations.

22. The system of claim 12, wherein the one or more computer systems are further programmed to perform operations comprising augmenting a relationship between the source records and the attributes related to the source records with a datestamp value representing a date the relationship was first identified.

* * * * *